(12) United States Patent
Okubo et al.

(10) Patent No.: US 11,125,859 B2
(45) Date of Patent: Sep. 21, 2021

(54) VEHICLE INSPECTION DEVICE

(71) Applicant: HONDA MOTOR CO., LTD., Tokyo (JP)

(72) Inventors: Michiaki Okubo, Tochigi (JP);
Kenichiro Kurai, Tochigi (JP);
Kazuyuki Fukamachi, Tochigi (JP);
Yasuhiro Okuno, Tochigi (JP);
Kazumori Sakai, Tochigi (JP)

(73) Assignee: HONDA MOTOR CO., LTD., Tokyo (JP)

(*) Notice: Subject to any disclaimer, the term of this patent is extended or adjusted under 35 U.S.C. 154(b) by 250 days.

(21) Appl. No.: 16/577,148

(22) Filed: Sep. 20, 2019

(65) Prior Publication Data

US 2020/0096607 A1    Mar. 26, 2020

(30) Foreign Application Priority Data

Sep. 25, 2018    (JP) .............................. JP2018-178950

(51) Int. Cl.
    *G01S 7/40*          (2006.01)
    *G01S 13/931*      (2020.01)

(52) U.S. Cl.
    CPC .......... *G01S 7/4026* (2013.01); *G01S 13/931* (2013.01)

(58) Field of Classification Search
CPC ........ G01S 7/40; G01S 7/4026; G01S 13/931; G01S 13/865; G01S 13/867; H01Q 1/3233; H01Q 15/14; H01Q 15/18; H01Q 15/20; H01Q 19/106
See application file for complete search history.

(56) References Cited

U.S. PATENT DOCUMENTS

| | | | | |
|---|---|---|---|---|
| 2,961,654 A * | 11/1960 | Simon | ....................... | G01S 7/40 342/165 |
| 6,437,731 B1 * | 8/2002 | Henrio | .................. | G01S 7/4026 342/165 |
| 6,636,172 B1 * | 10/2003 | Prestl | .................... | G01S 7/4026 342/173 |
| 8,918,302 B2 * | 12/2014 | Hukkeri | ................ | G01S 7/4021 702/95 |
| 9,645,051 B2 * | 5/2017 | Jin | ....................... | G01M 17/007 |

(Continued)

FOREIGN PATENT DOCUMENTS

JP      2005-331353      12/2005

*Primary Examiner* — Peter M Bythrow
(74) *Attorney, Agent, or Firm* — Rankin, Hill & Clark LLP

(57) ABSTRACT

The vehicle inspection device is used to adjust an optical axis of a radar device R in a vehicle in which the radar device R that acquires external environment information is attached to a vehicle body. The vehicle inspection device includes: a target robot T including a corner reflector 75 that reflects an electromagnetic wave emitted from the radar device R, and an electromagnetic wave characteristic measurement device 76 that measures characteristics of the electromagnetic wave emitted from the radar device R; and a control device 6 that controls the target robot T. The control device 6 calculates an attachment position of the radar device R and a direction of an optical axis on the basis of electromagnetic wave characteristics measured by the electromagnetic wave characteristic measurement device 76, and moves the target robot T to an inspection position that is determined on the basis of the calculation result.

6 Claims, 24 Drawing Sheets

(56) References Cited

U.S. PATENT DOCUMENTS

| | | | | |
|---|---|---|---|---|
| 10,458,811 B2* | 10/2019 | Voeller | ................... | G01S 17/931 |
| 10,890,648 B2* | 1/2021 | Appia | ................... | G01S 7/4026 |
| 11,009,586 B2* | 5/2021 | Zack | ......................... | G01S 7/40 |
| 11,009,587 B2* | 5/2021 | Conrad | ................. | G01S 13/931 |
| 2001/0012985 A1* | 8/2001 | Okamoto | ................. | G06T 7/80 |
| | | | | 702/94 |
| 2006/0164295 A1* | 7/2006 | Focke | ................... | G01S 13/867 |
| | | | | 342/174 |
| 2015/0134191 A1* | 5/2015 | Kim | ..................... | B62D 65/005 |
| | | | | 701/29.7 |
| 2016/0161602 A1* | 6/2016 | Prokhorov | ............ | G01S 7/4026 |
| | | | | 702/97 |
| 2018/0052223 A1* | 2/2018 | Stieff | ................... | G05D 1/0231 |
| 2018/0075675 A1* | 3/2018 | Kim | ..................... | G01S 13/931 |

\* cited by examiner

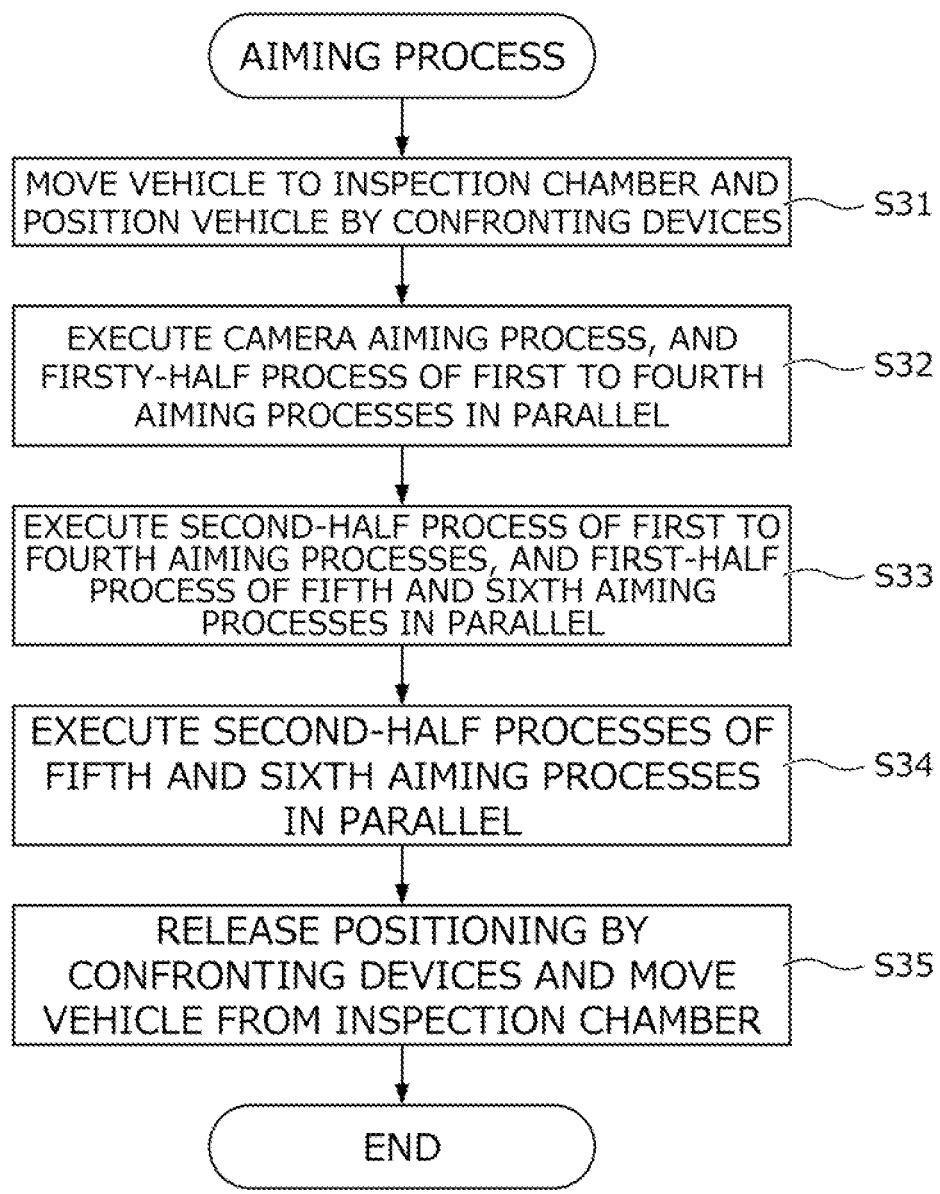

VEHICLE INSPECTION DEVICE

This application is based on and claims the benefit of priority from Japanese Patent Application No. 2018-178950, filed on 25 Sep. 2018, the content of which is incorporated herein by reference.

BACKGROUND OF THE INVENTION

Field of the Invention

The present invention relates to a vehicle inspection device. More specifically, the invention relates to a vehicle inspection device that is used to adjust a sensor axis of an external environment sensor that is attached to a vehicle.

Related Art

To realize a driving support function or an automatic driving function such as adaptive cruise control and an automatic brake system, an external environment sensor such as a radar device and a camera which detect an external environment is mounted on a vehicle. The external environment sensor has strong directivity, and thus it is necessary to attach the external environment sensor in an appropriate direction with respect to a vehicle body to allow the driving support function or the automatic driving function to be appropriately exhibited. According to this, a manufacturing and inspection process of a vehicle on which the external environment sensor is mounted includes an aiming process of adjusting an optical axis of the external environment sensor attached to the vehicle body.

For example, in the aiming process of a radar device, a target is installed at a predetermined position at the periphery of the vehicle provided in an inspection area. In addition, an electromagnetic wave is emitted from the radar device to the target, and a reflected wave by the target is measured to understand a deviation of an optical axis of the radar device with respect to a normal direction, and the optical axis of the radar device is adjusted so that the deviation disappears.

Japanese Unexamined Patent Application, Publication No. 2005-331353 discloses an optical axis adjustment method in which an optical axis of a radar device is adjusted by using a camera installed on the ceiling of an inspection chamber and a target that is movable along a rail installed on a floor of the inspection chamber. In the method disclosed in Japanese Unexamined Patent Application, Publication No. 2005-331353, a plan-view image of a vehicle in the inspection chamber is captured by the camera, a normal direction of the optical axis of the radar device attached to a vehicle body is specified on the basis of the plan-view image, and the target is moved on the rail so that the specified normal direction and a surface of the target become orthogonal to each other. According to the optical axis adjustment method disclosed in Japanese Unexamined Patent Application, Publication No. 2005-331353, the optical axis of the radar device can be adjusted by using the target installed at an appropriate position with respect to the vehicle in the inspection chamber.

SUMMARY OF THE INVENTION

However, when attaching the radar device to the vehicle body, not a little assembly errors occur. The assembly errors include not only the deviation of the optical axis direction of the radar device as described above but also a deviation of an attachment position of the radar device. However, in the positioning device disclosed in Japanese Unexamined Patent Application, Publication No. 2005-331353, a normal direction of the optical axis of the radar device is specified from the plan-view image of the vehicle, and thus an actual attachment position of the radar device or an actual optical axis direction is not detected. This corresponds to specifying of the normal direction of the optical axis on the assumption that the radar device is attached to an appropriate position of the vehicle. That is, according to the positioning device disclosed in Japanese Unexamined Patent Application, Publication No. 2005-331353, a position of the target is determined without considering the deviation of the attachment position of the radar device. Therefore, even when adjusting the optical axis of the radar device by using the target of which a position is determined by the positioning device of Japanese Unexamined Patent Application, Publication No. 2005-331353, the optical axis is apt to deviate from an original normal direction in an amount corresponding to the deviation of the attachment position of the radar device.

A detection error of the radar device which is caused by the deviation of the optical axis increases as a distance between an object and the radar device is longer. In recent years, it has been required that a position of an object can be detected by a radar device with accuracy up to sufficiently far away position, and thus there is a concern that it is difficult to adjust the optical axis of the radar device to a certain extent capable of realizing required accuracy in the positioning device of the related art.

An object of the invention is to provide a vehicle inspection device capable of adjusting a sensor axis of an external environment sensor with accuracy.

(1) According to an aspect of the invention, there is provided a vehicle inspection device that is used to adjust a sensor axis of a first external environment sensor in a vehicle in which the first external environment sensor that acquires external environment information is attached to a vehicle body. The vehicle inspection device includes: a moving body including a reflector that reflects an electromagnetic wave emitted from the first external environment sensor, and an electromagnetic wave characteristic measurement device that measures characteristics of the electromagnetic wave emitted from the first external environment sensor; and a control device that controls the moving body. The control device calculates an attachment position of the first external environment sensor and a direction of a sensor axis on the basis of electromagnetic wave characteristics measured by the electromagnetic wave characteristic measurement device, and moves the moving body to an inspection position that is determined on the basis of the calculation result.

(2) In this case, a second external environment sensor that acquires external environment information different from the information acquired by the first external environment sensor may be attached to the vehicle body, and the moving body may further include a target with respect to the second external environment sensor.

(3) In this case, an electromagnetic wave incident surface of the electromagnetic wave characteristic measurement device, and the reflector may be respectively provided on different surfaces of a main body of the moving body, and the control device may control the moving body so that the reflector faces the first external environment sensor at the inspection position.

(4) In this case, the main body may be provided with the reflector, the electromagnetic wave characteristic measurement device, and an electromagnetic wave absorbing body that absorbs the electromagnetic wave emitted from the first external environment sensor to suppress a reflected wave, the electromagnetic wave absorbing body may be provided on a surface that faces the first external environment sensor in a case where the reflector in the main body is made to face the first external environment sensor, and the electromagnetic wave characteristic measurement device may be provided in the main body to be hidden by the electromagnetic wave absorbing body when viewed from the first external environment sensor in a state in which the reflector is made to face the first external environment sensor.

(1) The vehicle inspection device of the invention includes the moving body on which the reflector that reflects the electromagnetic wave emitted from the first external environment sensor, and the electromagnetic wave characteristic measurement device that measures characteristics of the electromagnetic wave emitted from the first external environment sensor are mounted, and the control device that controls the moving body. The control device calculates the attachment position of the first external environment sensor in the vehicle body and the direction of the sensor axis on the basis of the electromagnetic wave characteristics of the first external environment sensor which are measured by the electromagnetic wave characteristic measurement device, and moves the moving body to the inspection position that is determined on the basis of the calculation result. According to the vehicle inspection device of the invention, the attachment position of the first external environment sensor in the vehicle body and the direction of the sensor axis are calculated by using the electromagnetic wave characteristic measurement device, and thus it is possible to set the inspection position of the moving body to an appropriate position corresponding to the attachment position of the sensor in which not a little deviation occurs for every vehicle, and the direction of the sensor axis. In addition, since the moving body is moved to the inspection position corresponding to an actual attachment position of the first external environment sensor and an actual direction of the sensor axis, it is possible to adjust the sensor axis of the first external environment sensor with accuracy.

In addition, according to the vehicle inspection device of the invention, the electromagnetic wave characteristic measurement device that is used to calculate the attachment position of the first external environment sensor with respect to the vehicle body and the direction of the sensor axis, and the reflector that is used when adjusting the sensor axis are mounted on the same moving body, and thus a measurement position that is an installation position of the moving body when measuring the characteristics of the electromagnetic wave by using the electromagnetic wave characteristic measurement device, and an inspection position that is an installation position of the moving body when adjusting the sensor axis of the first external environment sensor by using the reflector can be made to be close to each other. According to this, it is possible to shorten a movement amount of the moving body, and thus it is possible to shorten time taken to adjust the sensor axis of the first external environment sensor.

(2) In the vehicle inspection device of the invention, the moving body is further provided with a target with respect to the second external environment sensor in addition to the reflector that is used for adjustment of the sensor axis of the first external environment sensor. According to the vehicle inspection device of the invention, the reflector and the target which are used for adjustment of the first and second external environment sensors which acquire different pieces of external environment information are provided in one moving body, and thus it is not necessary to install the vehicle inspection device for every kind of the external environment sensor. As a result, it is possible to improve space efficiency of an inspection chamber. In addition, since the general-purpose properties of the vehicle inspection device are improved as described above, it is possible to flexibly set an adjustment line for carrying out adjustment of the external environment sensor mounted on a vehicle in correspondence with the kind of vehicles.

(3) In the vehicle inspection device of the invention, the electromagnetic wave incident surface of the electromagnetic wave characteristic measurement device, and the reflector are respectively provided on different surfaces of the main body, and the control device controls the moving body so that the reflector faces the first external environment sensor at the inspection position determined by using the electromagnetic wave characteristic measurement device. According to this, it is possible to prevent the reflector from having an effect on measurement of the characteristics of the electromagnetic wave by the electromagnetic wave characteristic measurement device, or it is possible to prevent the electromagnetic wave incident surface of the electromagnetic wave characteristic measurement device from having an effect on adjustment of the sensor axis using the reflector.

(4) In the vehicle inspection device of the invention, the reflector, the electromagnetic wave characteristic measurement device, and the electromagnetic wave absorbing body are provided in the main body. In addition, the electromagnetic wave characteristic measurement device is provided in the main body to be hidden by the electromagnetic wave absorbing body when viewed from the first external environment sensor in a state in which the reflector is made to face the first external environment sensor. According to this, when adjusting the sensor axis of the first external environment sensor in a state in which the reflector is made to face the first external environment sensor, it is possible to prevent the electromagnetic wave emitted from the first external environment sensor from being reflected by the electromagnetic wave characteristic measurement device, and thus it is possible to improve adjustment accuracy of the sensor axis. In addition, according to the vehicle inspection device of the invention, the electromagnetic wave absorbing body may be provided only on a surface that faces the first external environment sensor in a case where the reflector in the main body is made to face the first external environment sensor, and thus it is possible to reduce the amount of the electromagnetic wave absorbing body provided in the main body as much as possible, and thus it is possible to reduce the cost of the vehicle inspection device.

BRIEF DESCRIPTION OF THE DRAWINGS

FIG. 14 is a flowchart illustrating a specific procedure of an aiming process in a vehicle inspection system according to a second embodiment of the invention.

DETAILED DESCRIPTION OF THE INVENTION

First Embodiment

Hereinafter, a configuration of a vehicle inspection system S according to a first embodiment of the invention will be described in detail with the accompanying drawings.

Figure 1:
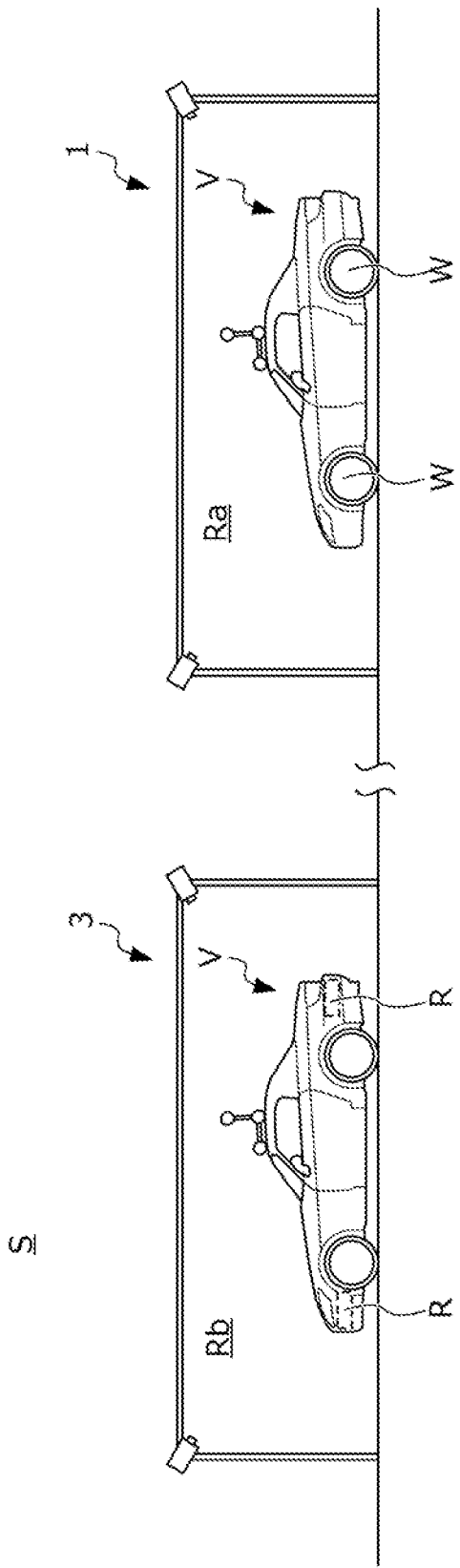
FIG. 1 is a view schematically illustrating a configuration of a vehicle inspection system according to a first embodiment of the invention.

FIG. 1 is a view schematically illustrating a configuration of the vehicle inspection system S. The vehicle inspection system S is a facility that is used when inspecting a vehicle V in which a plurality of external environment sensors R and C that acquires external environment information are attached to a vehicle body. The external environment sensor R is a radar device that emits an electromagnetic wave (for example, a millimeter wave) toward the outside of the vehicle V and measures a reflected wave thereof to acquire external environment information. Hereinafter, the external environment sensor R is referred to as a radar device R. The external environment sensor C is a camera that acquires external environment information by capturing an image with an imaging element (not illustrated). Hereinafter, the external environment sensor C is referred to as an in-vehicle camera C.

FIG. 1 illustrates configurations of an alignment system 1 and an optical axis adjustment system 3 which are facilities used when executing, particularly, an alignment tester process and an aiming process among a plurality of inspection processes on the vehicle V by using the vehicle inspection system S.

Figure 2A:
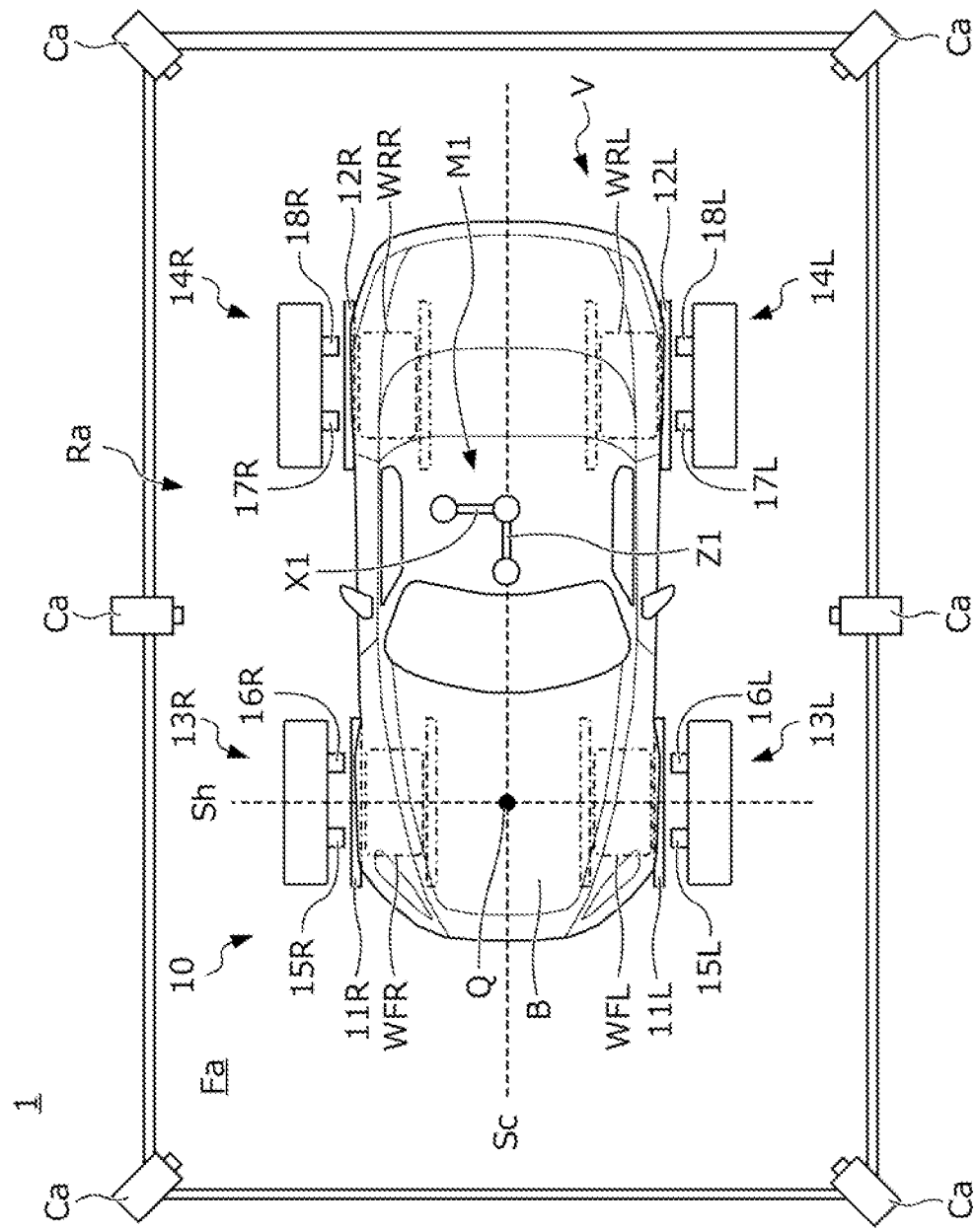
FIG. 2A is a plan view of an alignment system.
Figure 2B:
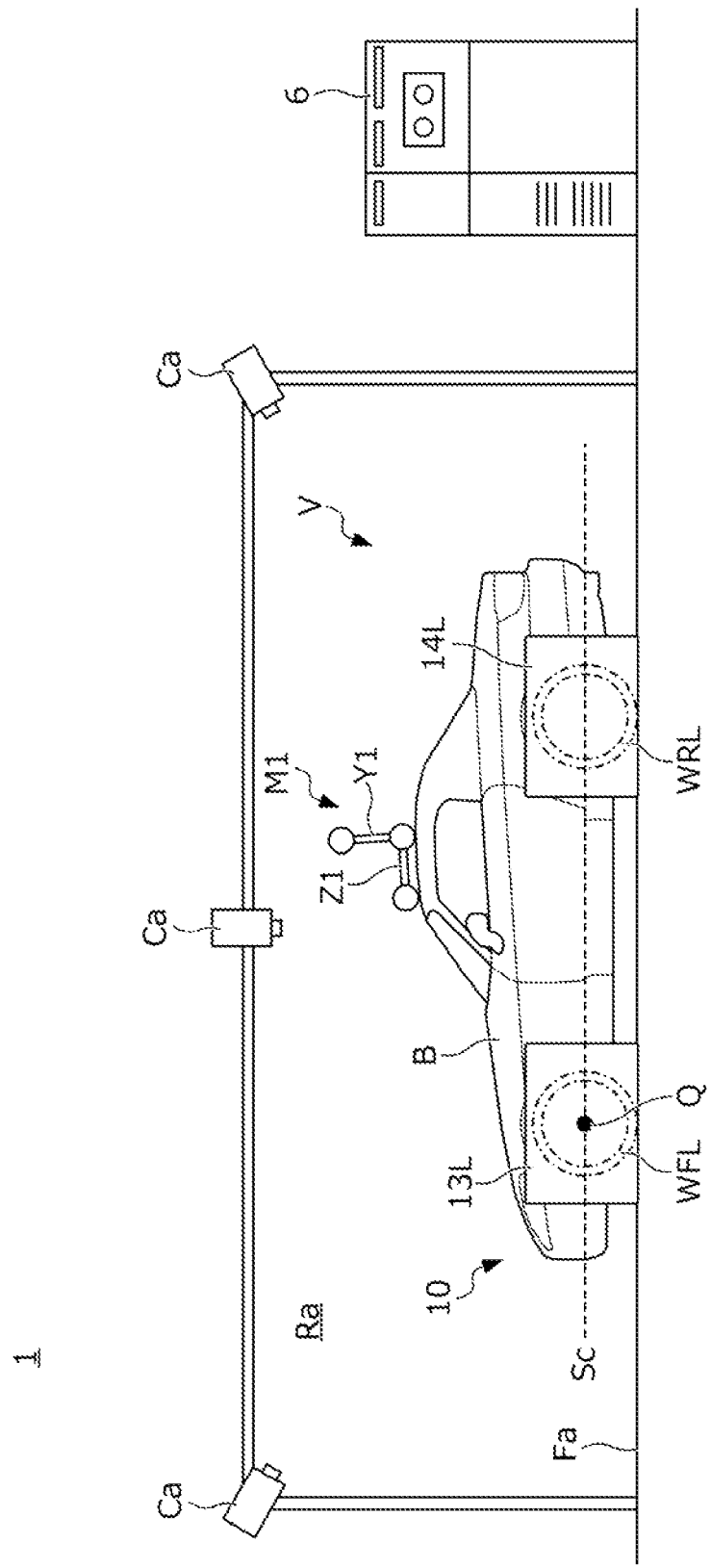
FIG. 2B is a side view of the alignment system.
Figure 4A:
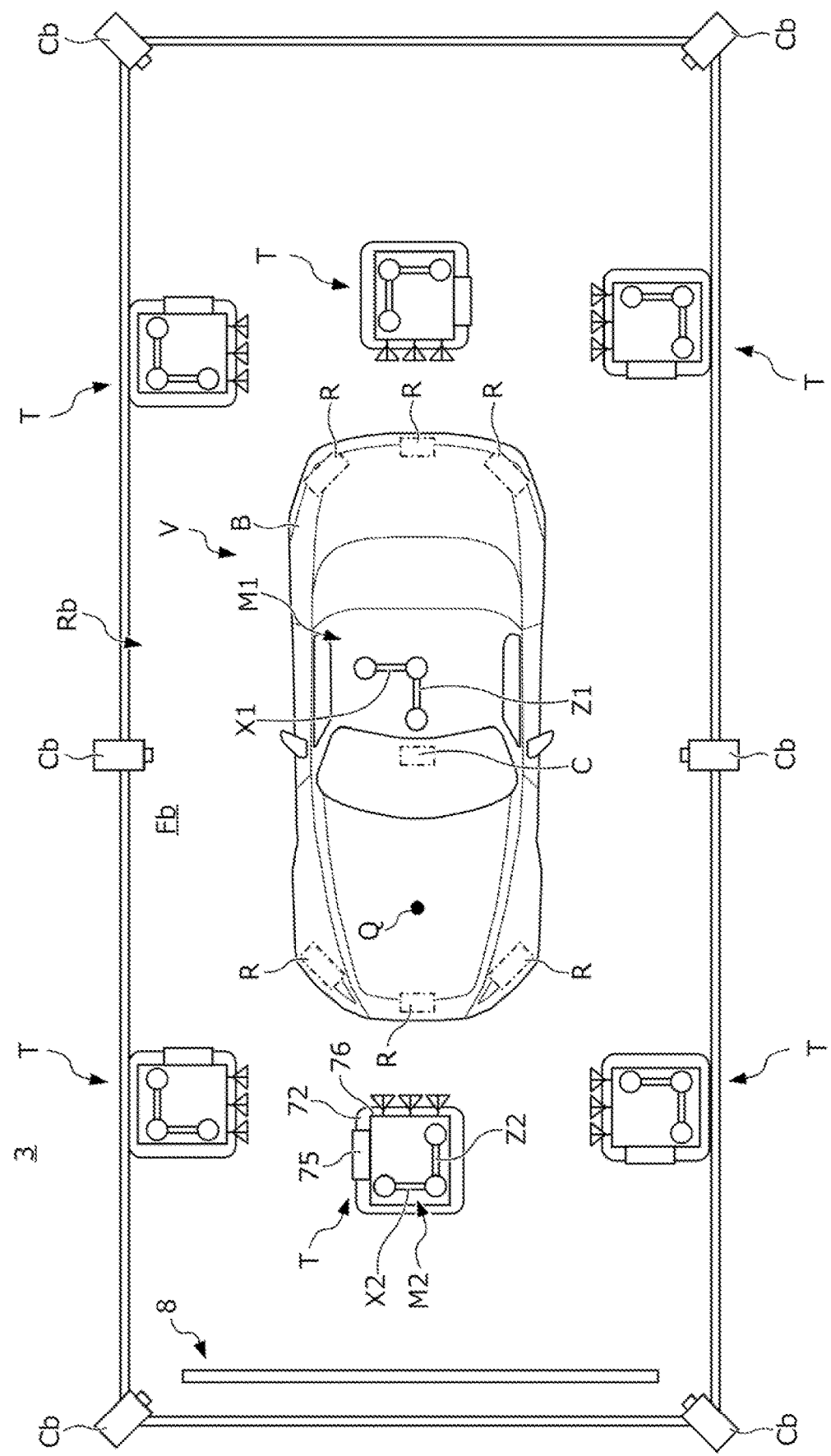
FIG. 4A is a plan view of an optical axis adjustment system.
Figure 4B:
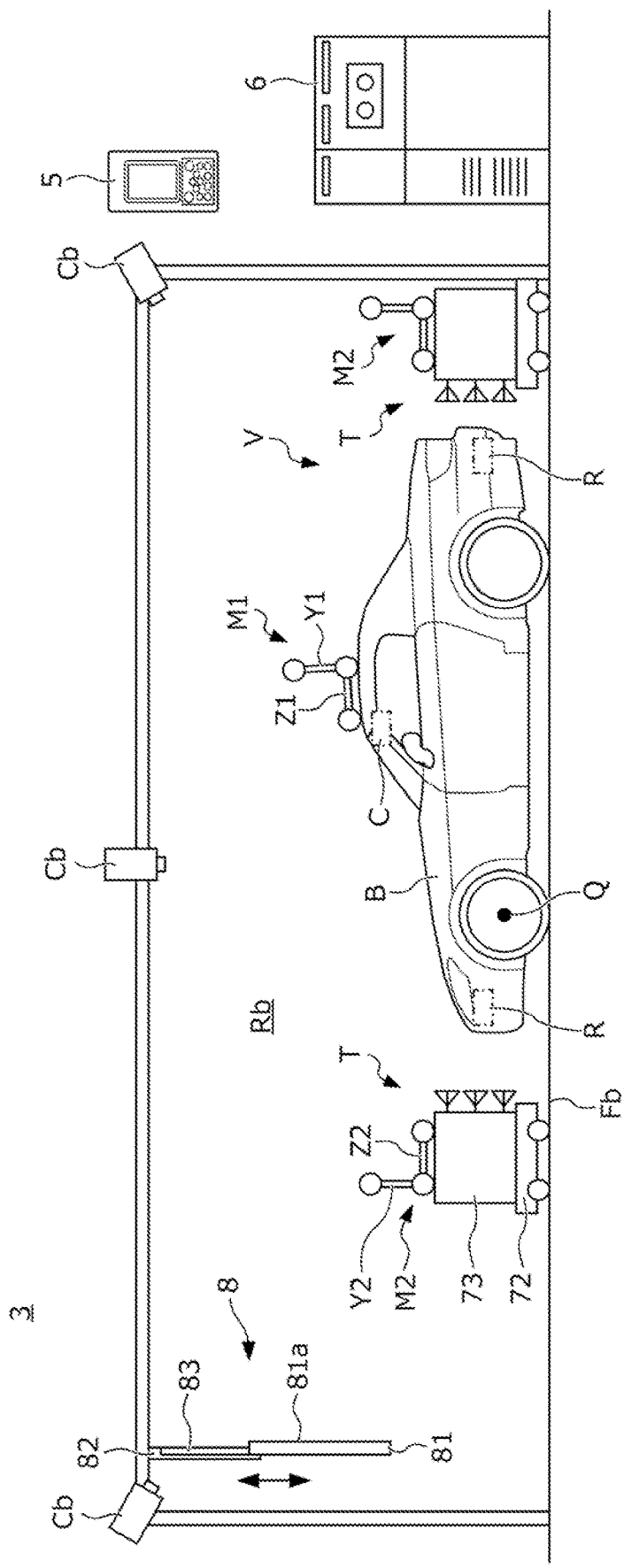
FIG. 4B is a side view of the optical axis adjustment system.

In the alignment tester process, an attachment angle, an attachment position, and the like of wheels W, which are movable components attached to a vehicle body of the vehicle V, with respect to an axle are adjusted in an inspection chamber Ra in which the alignment system 1 to be described later with reference to FIG. 2A and FIG. 2B is installed. In the aiming process, a direction of an optical axis of the radar device R and the in-vehicle camera C with respect to the vehicle V after being subjected to the alignment tester process is adjusted in an inspection chamber Rb in which the optical axis adjustment system 3 to be described later with reference to FIG. 4A and FIG. 4B is installed.

Hereinafter, detailed configurations of the alignment system 1 and the optical axis adjustment system 3 will be sequentially described with reference to the accompanying drawings.

FIG. 2A is a plan view of the alignment system 1, and FIG. 2B is a side view of the alignment system 1.

The alignment system 1 includes an alignment measurement device 10 installed on a floor surface Fa of the inspection chamber Ra, a plurality of (for example, six) cameras Ca which are installed on the ceiling of the inspection chamber Ra, and a control device 6 that processes an image captured by the cameras Ca.

The alignment measurement device 10 includes front wheel guides 11L and 11R and rear wheel guides 12L and 12R which are installed on the floor surface Fa, front housings 13L and 13R which are installed on an outer side of the front wheel guides 11L and 11R in a vehicle width direction, and rear housings 14L and 14R which are installed on an outer side of the rear wheel guides 12L and 12R in the vehicle width direction.

The vehicle V is stopped at a defined position in the inspection chamber Ra by advancing front wheels WFL and WFR, and rear wheels WRL and WRR along the front wheel guides 11L and 11R and the rear wheel guides 12L and 12R.

The front housings 13L and 13R are respectively provided with front wheel confronting devices 15L and 15R and front wheel sensors 16L and 16R, and the rear housings 14L and 14R are respectively provided with rear wheel confronting devices 17L and 17R and rear wheel sensors 18L and 18R.

The front wheel sensors 16L and 16R and the rear wheel sensors 18L and 18R respectively measure a toe angle, a caster angle, or the like of the front wheels WFL and WFR and the rear wheels WRL and WRR. The front wheel confronting devices 15L and 15R respectively press the front wheels WFL and WFR to set a position of a front portion of a vehicle body B to a defined position. The rear wheel confronting devices 17L and 17R respectively press the rear wheels WRL and WRR to set a position of a rear portion of the vehicle body B to a defined position. Note that, in the following description, a posture of the vehicle body B, which is realized in the inspection chamber Ra by using the front wheel confronting devices 15L and 15R and the rear wheel confronting devices 17L and 17R, is referred to as a confronting posture. In addition, in a state in which the confronting posture is secured by the confronting devices 15L, 15R, 17L, and 17R, a position and a posture of an axle Sh of the front wheels WFL and WFR in the inspection chamber Ra are fixed, and thus the position and the posture can be specified with accuracy. Here, in the following description, an inspection reference point Q is defined to the center of the axle Sh, that is, an intersection between the axle Sh and a vehicle body central axis Sc that extends along a front and rear direction at a vehicle width direction center of the vehicle body B.

A first marker M1 is attached to a roof panel that is an upper portion of the vehicle body B. The first marker M1 has a predetermined three-dimensional shape. More specifically, the first marker M1 is constructed by attaching four spherical reflection markers to ends of three axis bodies X1, Y1, and Z1 which are orthogonal to each other. The first marker M1 is attached to the roof panel of the vehicle body B with a tape (not illustrated) so that the axis body X1 becomes approximately parallel to a vehicle width direction of the vehicle body B, the axis body Y1 becomes approximately parallel to a vertical direction of the vehicle body B, and the axis body Z1 becomes approximately parallel to an advancing direction of the vehicle body B.

The six cameras Ca are installed with predetermined intervals at ceiling side portions of side walls which partition the inspection chamber Ra to surround the vehicle body B in a state in which a confronting posture is secured by the confronting devices 15L, 15R, 17L, and 17R. The cameras Ca photograph the vehicle body B and the first marker M1 attached to the roof panel in a state in which the confronting posture is secured in correspondence with a command from the control device 6, and transmits image data obtained through the photographing to the control device 6. The control device 6 calculates a position and a posture of the first marker M1 with reference to the inspection reference point Q of the vehicle body B by using the image data obtained by the cameras Ca as to be described later with reference to FIG. 8.

Figure 3:
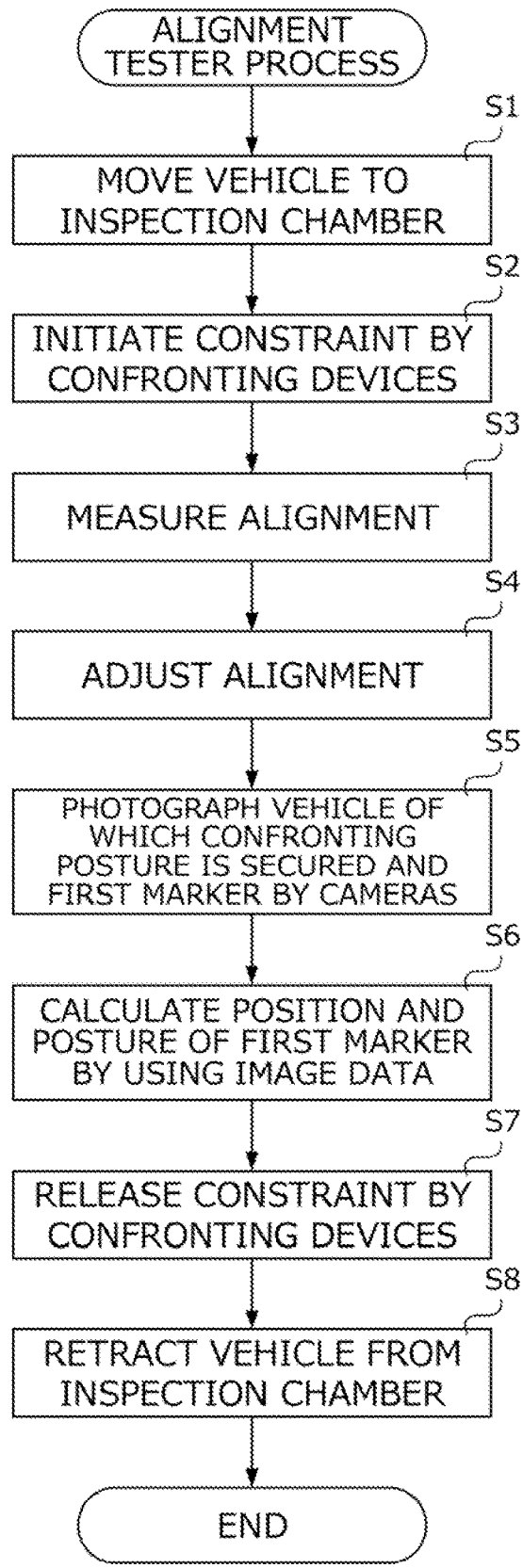
FIG. 3 is a flowchart illustrating a specific procedure of an alignment tester process using the alignment system.

FIG. 3 is a flowchart illustrating a specific procedure of an alignment tester process using the alignment system 1 as described above.

First, in S1, an operator moves the vehicle V to which the first marker M1 is attached in advance to the inspection chamber Ra in which the alignment system 1 is installed. In S2, the operator initiates constraint of the vehicle body B by the confronting devices 15L, 15R, 17L, and 17R. Then, the vehicle body B is maintained in the confronting posture until the constraint by the confronting devices 15L, 15R, 17L, and 17R is released. In S3, the operator measures alignment by using the alignment measurement device 10, and adjusts the alignment in S4 by using a measurement result in S3.

In S5, the operator photographs the vehicle body B and the first marker M1 after alignment adjustment by using the six cameras Ca. In S6, the control device 6 calculates a position and a posture of the first marker M1 with reference to the inspection reference of the vehicle body B by using image data obtained by the six cameras Ca. In S7, the operator releases the constraint of the vehicle body B by the confronting devices 15L, 15R, 17L, and 17R. In S8, the operator retracts the vehicle V from the inspection chamber Ra.

FIG. 4A is a plan view of the optical axis adjustment system 3, and FIG. 4B is a side view of the optical axis adjustment system 3.

The vehicle V of which the alignment is adjusted by using the above-described alignment system 1 is conveyed to the optical axis adjustment system 3. Hereinafter, description will be given of a case where six radar devices R and one in-vehicle camera C are attached to the vehicle body B of the vehicle V, and in the optical axis adjustment system 3, directions of optical axes of the six radar devices R and the one in-vehicle camera C are adjusted. As illustrated in FIG. 4A, the radar devices R are attached one by one to a central portion, a leftward portion, and a rightward portion on a front side of the vehicle body B, and a central portion, a leftward portion, and a rightward portion on a rear side of the vehicle body B. In addition, the in-vehicle camera C is attached to a windshield of the vehicle body B.

The optical axis adjustment system 3 includes front wheel confronting devices and rear wheel confronting devices (not illustrated), a plurality of (for example, six; the same as in the radar devices mounted on the vehicle body B) target robots T which are movable on a floor surface Fb of the inspection chamber Rb, a camera inspection device 8 installed on the ceiling of the inspection chamber Rb, a plurality of (for example, six) cameras Cb installed on the ceiling of the inspection chamber Rb, a control device 6 that processes an image captured by the six cameras Cb and controls the target robots T and the camera inspection device 8, and a vehicle inspection device 5 that can perform communication with the vehicle V. As described above, the first marker M1 is attached to the roof panel of the vehicle body B as described above.

The front wheel confronting device and the rear wheel confronting device have the same configuration as in the front wheel confronting devices 15L and 15R and the rear wheel confronting devices 17L and 17R installed in the alignment system 1, and thus illustration and detailed description thereof will be omitted in FIG. 4A and FIG. 4B. The front wheel confronting devices and the rear wheel confronting devices make the posture of the vehicle body B in the inspection chamber Rb to a predetermined confronting posture.

Figure 5:
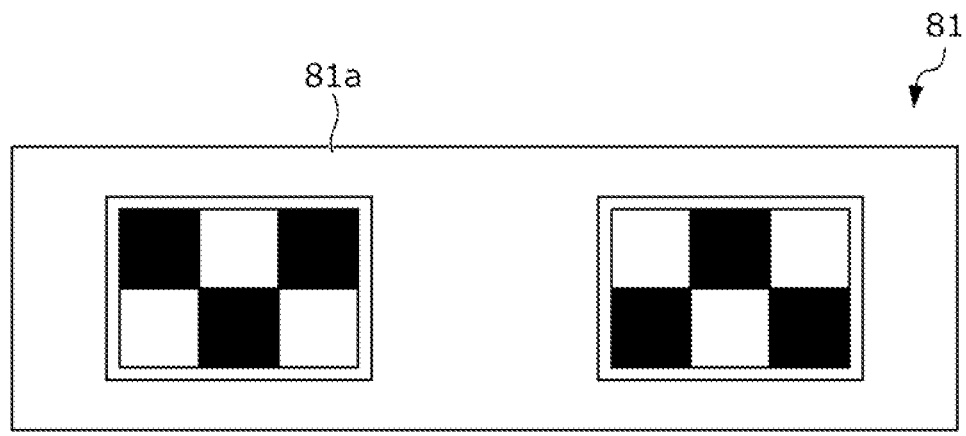
FIG. 5 is a view illustrating a configuration of an inspection surface of a target board of a camera inspection device.

The camera inspection device 8 includes a plate-shaped target board 81 and a board support portion 82 that supports the target board 81. A plurality of checkerboard patterns are drawn on an inspection surface 81a that is a surface of the target board 81 on the vehicle V side as illustrated in FIG. 5. An optical axis of the in-vehicle camera C is adjusted by photographing the checkerboard patterns drawn on the inspection surface 81a of the target board 81 that is set at a predetermined inspection position with the in-vehicle camera C.

The board support portion 82 is fixed to the ceiling of the inspection chamber Rb. A sliding rail 83 extending along a vertical direction is formed in the board support portion 82. The target board 81 is supported to slide along the vertical direction by the sliding rail 83 as indicated by an arrow in FIG. 4B. When adjusting the optical axis of the in-vehicle camera C, the camera inspection device 8 sets the target board 81 to an inspection position by lowering the target board 81 along the sliding rail 83, and makes the inspection surface 81a of the target board 81 face the in-vehicle camera C. In addition, after adjusting the optical axis of the in-vehicle camera C, the camera inspection device 8 sets the target board 81 to a retraction position determined in advance by raising the target board 81 along the sliding rail 83.

Figure 6A:
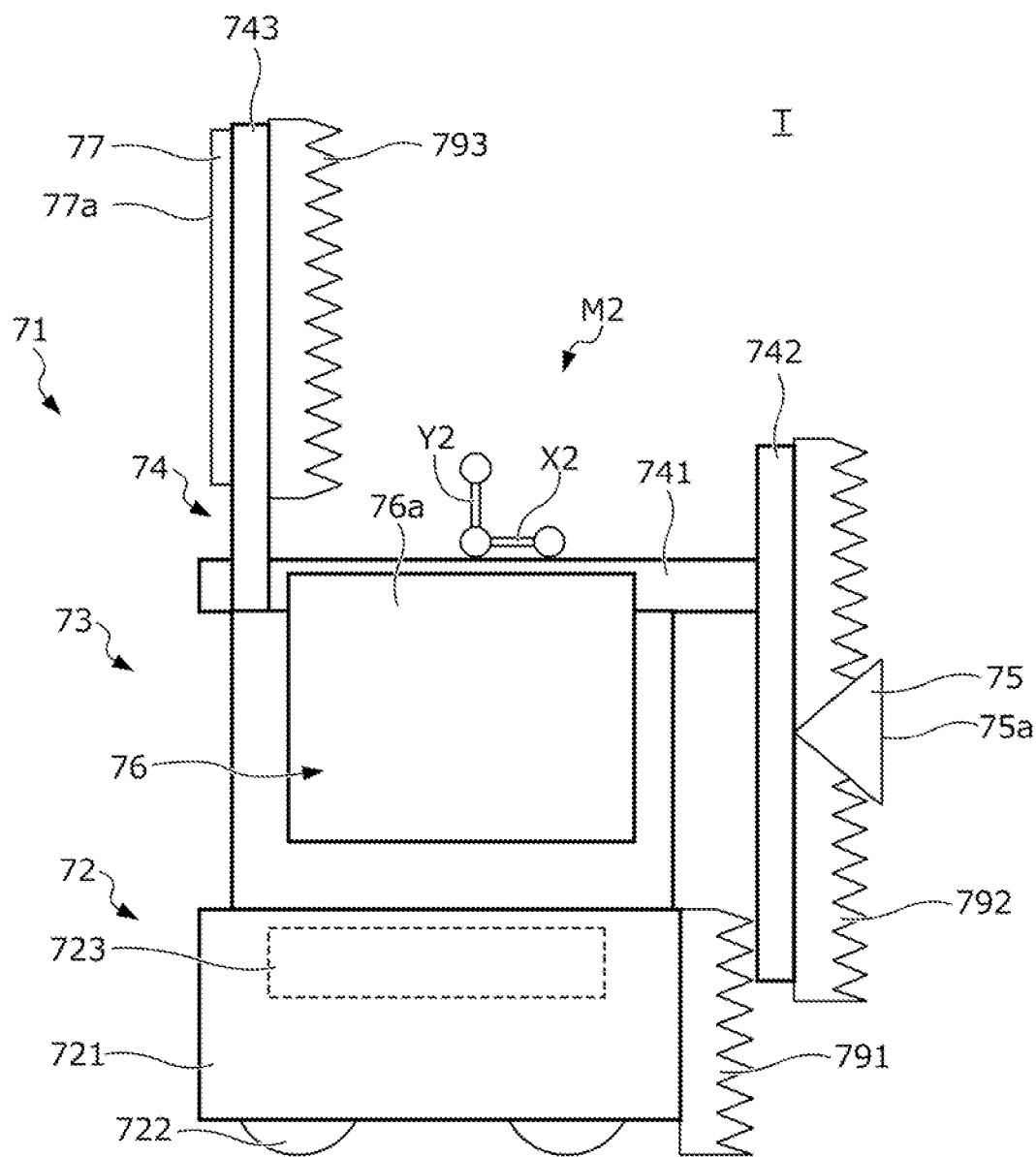
FIG. 6A is a left side view of a target robot.
Figure 6B:
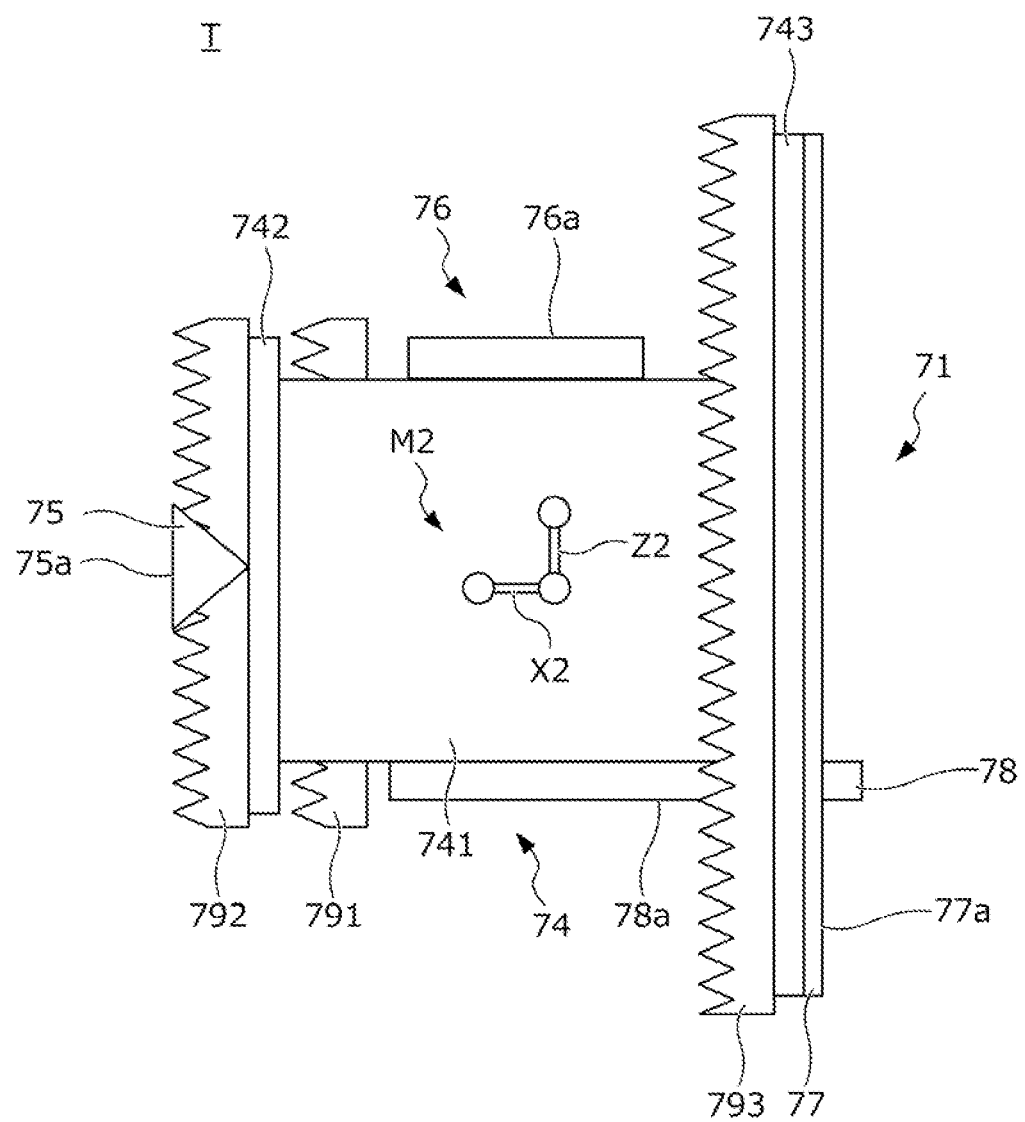
FIG. 6B is a plan view of the target robot.
Figure 6C:
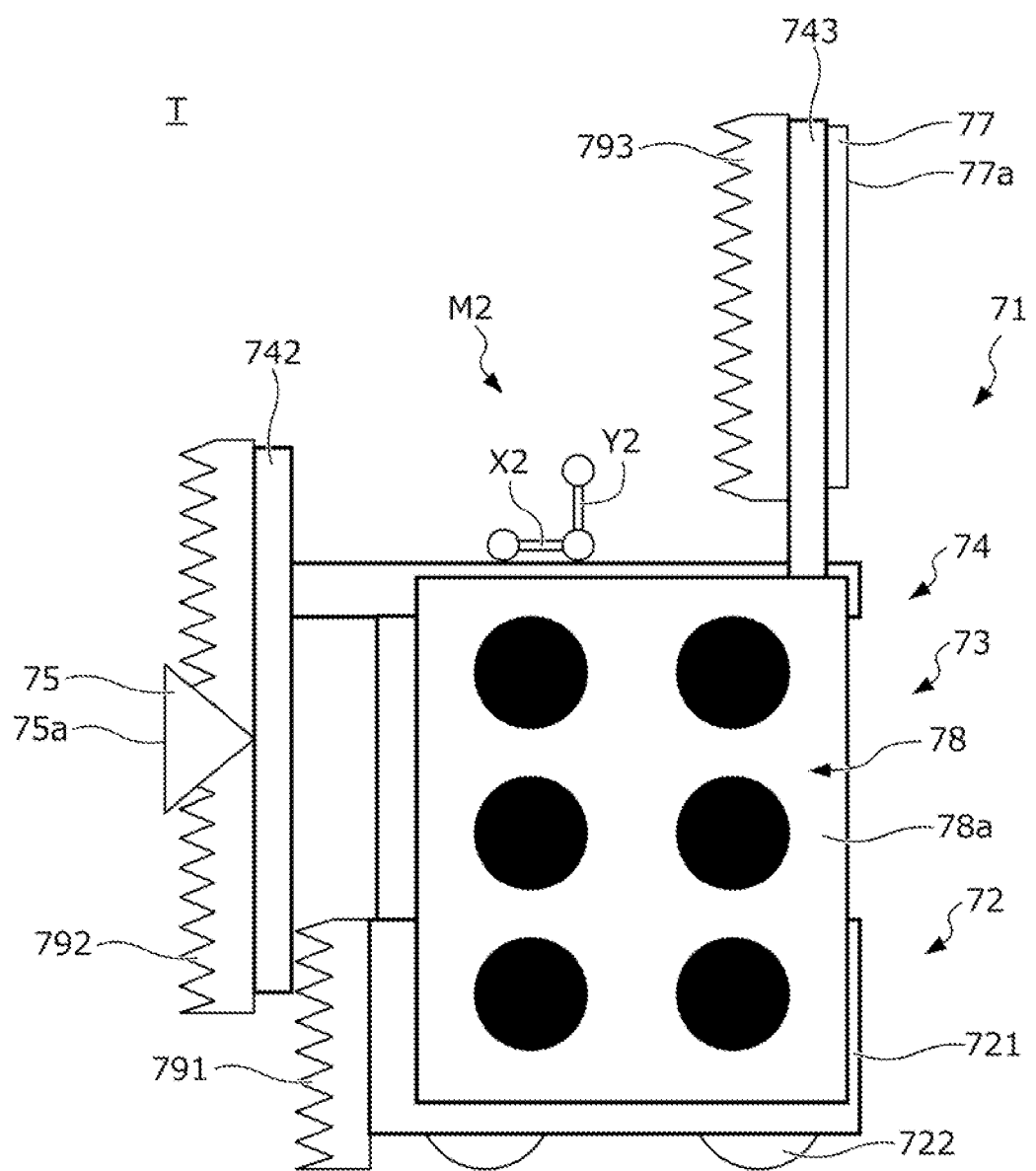
FIG. 6C is a right side view of the target robot.

Next, a configuration of the target robots T will be described with reference to FIGS. 6A to 6C and FIG. 7. FIG. 6A is a left side view of each of the target robots T, FIG. 6B is a plan view of the target robot T, and FIG. 6C is a right side view of the target robot T.

The target robot T includes a travel device 72, a corner reflector 75 that reflects an electromagnetic wave emitted from the radar device R, an electromagnetic wave characteristic measurement device 76 that measures characteristics of the electromagnetic wave emitted from the radar device R, a first target board 77 and a second target board 78 which are targets with respect to an external environment sensor different from the radar device R, a frame 74 that supports the corner reflector 75, the electromagnetic wave characteristic measurement device 76, and the target boards 77 and 78, and a posture changing device 73 that changes a posture of the frame 74 with respect to the travel device 72.

Figure 7:
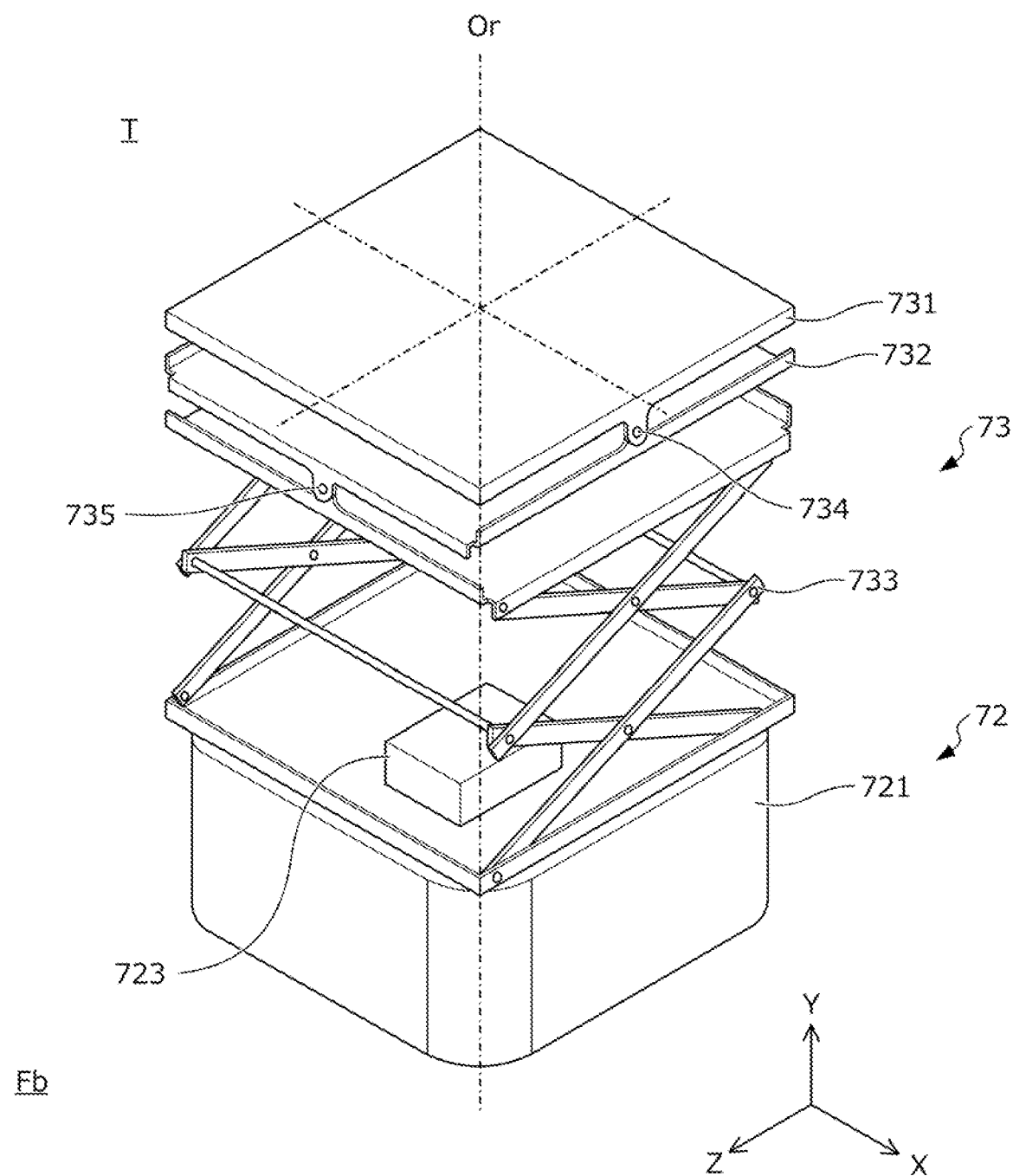
FIG. 7 is a view illustrating a configuration of a travel device and a posture changing device in a target robot T.

FIG. 7 is a perspective view illustrating configurations of the travel device 72 and the posture changing device 73 in the target robot T.

The travel device 72 includes a box-shaped main body 721, a driving wheel 722 supported to the main body 721, and a driving device 723 that rotates the driving wheel 722. The posture changing device 73 is provided in an upper portion of the main body 721.

The driving device 723 rotates the driving wheel 722 by using electric power supplied from a battery (not illustrated) to move the main body 721 and the posture changing device 73 provided in the main body 721 on the floor surface Fb. The driving device 723 can translate the main body 721 and the posture changing device 73 along an X-axis that is parallel to the floor surface Fb, or along a Z-axis that is parallel to the floor surface Fb and is orthogonal to the X-axis. In addition, the driving device 723 can rotate the main body 721 and the posture changing device 73 around a central axis Or of the main body 721 which is parallel to the Y-axis in addition to the translation along the X-axis and the Z-axis.

The posture changing device 73 includes a plate-shaped first stage 731 to which the frame 74 is attached, a second stage 732 that supports the first stage 731, and an elevating device 733 that supports the second stage 732.

The elevating device 733 is provided in an upper portion of the main body 721 of the travel device 72. For example, as illustrated in FIG. 7, the elevating device 733 elevates the first stage 731 and the second stage 732 along the central axis Or by a jack mechanism constructed by connecting both ends and central portions of a plurality of link members to each other.

The second stage 732 is rotatably connected to the elevating device 733 through a second rotation shaft 735. The second rotation shaft 735 orthogonally intersects the central axis Or and is parallel to the Z-axis. According to this, in the posture changing device 73, it is possible to rotate the first stage 731 and the second stage 732 around the Z-axis.

The first stage 731 is rotatably connected to the second stage 732 through a first rotation shaft 734. The first rotation shaft 734 orthogonally intersects the central axis Or and is parallel to the X-axis. According to this, in the posture changing device 73, it is possible to rotate the first stage 731 around the X-axis. The posture changing device 73 is provided in the travel device 72 in such a manner that the first stage 731 and the second stage 732 intersect the central axis Or of the main body 721 at central points of the first stage 731 and the second stage 732.

As described above, in the target robot T, the travel device 72 and the posture changing device 73 are used, and thus it is possible to translate or rotate the frame 74, and the corner reflector 75, the electromagnetic wave characteristic measurement device 76, and the target boards 77 and 78 which are supported by the frame 74 along the X-axis, the Z-axis, and the Y-axis or around the X-axis, the Z-axis, and the Y-axis.

Returning to FIG. 6A to FIG. 6C, the frame 74 includes a plate-shaped main frame 741 attached to the first stage 731 of the posture changing device 73, a reflector support frame 742 provided in an end of the main frame 741 on a front surface side (a left side in FIG. 6B), and a board support frame 743 provided in an end of the main frame 741 on a rear surface side (a right side in FIG. 6B, that is, a side opposite to the reflector support frame 742).

The electromagnetic wave characteristic measurement device 76 is provided in a left end of the main frame 741 (refer to FIG. 6A). The electromagnetic wave characteristic measurement device 76 measures characteristics of an electromagnetic wave (for example, an intensity distribution, a phase, or the like of the electromagnetic wave) incident to an electromagnetic wave incident surface 76a that faces an outer side of the main frame 741, and wirelessly transmits characteristic data obtained through the measurement to the control device 6.

The plate-shaped second target board 78 is provided in a right end of the main frame 741 (refer to FIG. 6C). For example, as illustrated in FIG. 6C, the second target board 78 is provided in the main frame 741 in such a manner that an inspection surface 78a faces a side opposite to the electromagnetic wave incident surface 76a of the electromagnetic wave characteristic measurement device 76. As illustrated in FIG. 6C, a plurality of black circular patterns are drawn on the inspection surface 78a of the second target board 78. The second target board 78 is used when adjusting an optical axis of a lane watch camera (not illustrated) that is provided in a door mirror of the vehicle V. That is, the optical axis of the lane watch camera is adjusted by photographing the black circular patterns drawn on the inspection surface 78a of the second target board 78 that is set to a predetermined inspection position with a lane watch camera. In the following description, description of a specific procedure of adjusting the optical axis of the lane watch camera mounted on the vehicle V by using the second target board 78 will be omitted.

The second marker M2 is attached to a predetermined position of an upper portion of the main frame 741. The second marker M2 has the same three-dimensional shape as in the first marker M1. More specifically, the second marker M2 is constructed by attaching four spherical reflection markers to ends of three axis bodies X2, Y2, and Z2 which are orthogonal to each other. The second marker M2 is attached to an upper portion of the main frame 741 with a tape (not illustrated) so that the axis body X2 becomes approximately parallel to the electromagnetic wave incident surface 76a of the electromagnetic wave characteristic measurement device 76, the axis body Y2 becomes approximately parallel to a vertical direction, and the axis body Z2 becomes approximately orthogonal to the electromagnetic wave incident surface 76a.

The reflector support frame 742 has a plate shape and is provided in a front-side end of the main frame 741. A triangular pyramid shaped corner reflector 75 that reflects an electromagnetic wave emitted from the radar device R is provided at an approximately center of the reflector support frame 742. The corner reflector 75 is provided in the reflector support frame 742 so that a reflection surface 75a thereof faces a direction different from that of the electromagnetic wave incident surface 76a of the electromagnetic wave characteristic measurement device 76 and the inspection surface 78a of the second target board 78, more specifically, a direction that is approximately orthogonal to the electromagnetic wave incident surface 76a and the inspection surface 78a.

The board support frame 743 has a plate shape, and is provided in an end of the main frame 741 on a rear surface side. The first target board 77 having a plate shape is provided in the board support frame 743 (refer to FIG. 6A). For example, as illustrated in FIG. 6A, the first target board 77 is provided in the board support frame 743 at a position higher than the corner reflector 75 in such a manner that the inspection surface 77a faces a side opposite to the reflection surface 75a of the corner reflector 75. A plurality of checkered patterns as illustrated in FIG. 5 are drawn on the inspection surface 77a of the first target board 77. The first target board 77 is used when adjusting an optical axis of the in-vehicle camera C. That is, the optical axis of the in-vehicle camera C is adjusted by photographing the checkerboard patterns drawn on the inspection surface 77a of the first target board 77 that is set at a predetermined inspection position with the in-vehicle camera C. Hereinafter, description will be given of a case where the optical axis of the in-vehicle camera C is adjusted by using the camera inspection device 8, and description of a specific procedure of adjusting the optical axis of the in-vehicle camera C by using the first target board 77 will be omitted.

In the target robot T as described above, the robot main body 71 that supports the corner reflector 75, the electromagnetic wave characteristic measurement device 76, and the like includes the travel device 72, the posture changing device 73, and the frame 74.

When adjusting the optical axis of the radar device R by using the corner reflector 75, the robot main body 71 is provided with a plurality of electromagnetic wave absorbing bodies 791, 792, and 793 which absorb the electromagnetic wave emitted from the radar device R and suppress a reflected wave to prevent the electromagnetic wave emitted from the radar device R from being reflected from a member other than the corner reflector 75 and having an effect on adjustment of the optical axis of the radar device R.

As illustrated in FIG. 6A to FIG. 6C, the electromagnetic wave absorbing bodies 791, 792, and 793 have a plate shape, and are provided on surfaces facing the radar device R in a case where the corner reflector 75 in the robot main body 71 faces the radar device R set as a target.

A first electromagnetic wave absorbing body 791 is attached to the main body 721 to cover a front surface side of the travel device 72. A second electromagnetic wave absorbing body 792 is attached to the reflector support frame 742 to cover a front-side surface of the reflector support frame 742 other than the corner reflector 75. As illustrated in FIG. 6B, the electromagnetic wave characteristic measurement device 76 is provided in the robot main body 71 to be hidden by the second electromagnetic wave absorbing body 792 when viewed from the radar device R in a state in which the corner reflector 75 is made to face the radar device R that is set as a target. A third electromagnetic wave absorbing body 793 is attached to the board support frame 743 to cover a front surface side of the board support frame 743.

Since the plurality of electromagnetic wave absorbing bodies 791 to 793 are provided with respect to the robot main body 71 as described above, in a state in which the corner reflector 75 is made to face the radar device R, members which constitute the target robot T except for the corner reflector 75 are hidden by the electromagnetic wave absorbing bodies 791 to 793.

Returning to FIG. 4A and FIG. 4B, the six cameras Cb are installed with predetermined intervals at ceiling side portions of side walls which partition the inspection chamber Rb to surround the vehicle body B installed in the inspection chamber Rb. The cameras Cb photograph the vehicle body B and the first marker M1 attached to the roof panel of the vehicle body B, and the six target robots T and the second marker M2 attached to defined positions of upper portions of the target robots T, and transmits image data obtained through the photographing to the control device 6.

The vehicle inspection device 5 is connected to a vehicle ECU (not illustrated) mounted on the vehicle body B through a communication line, and can perform communication with the vehicle ECU. The vehicle ECU emits an electromagnetic wave (for example, a millimeter wave) from the radar devices R mounted on the vehicle body B or adjusts a direction of an optical axis of each of the radar devices R in correspondence with a command signal transmitted from the vehicle inspection device 5.

Figure 8:
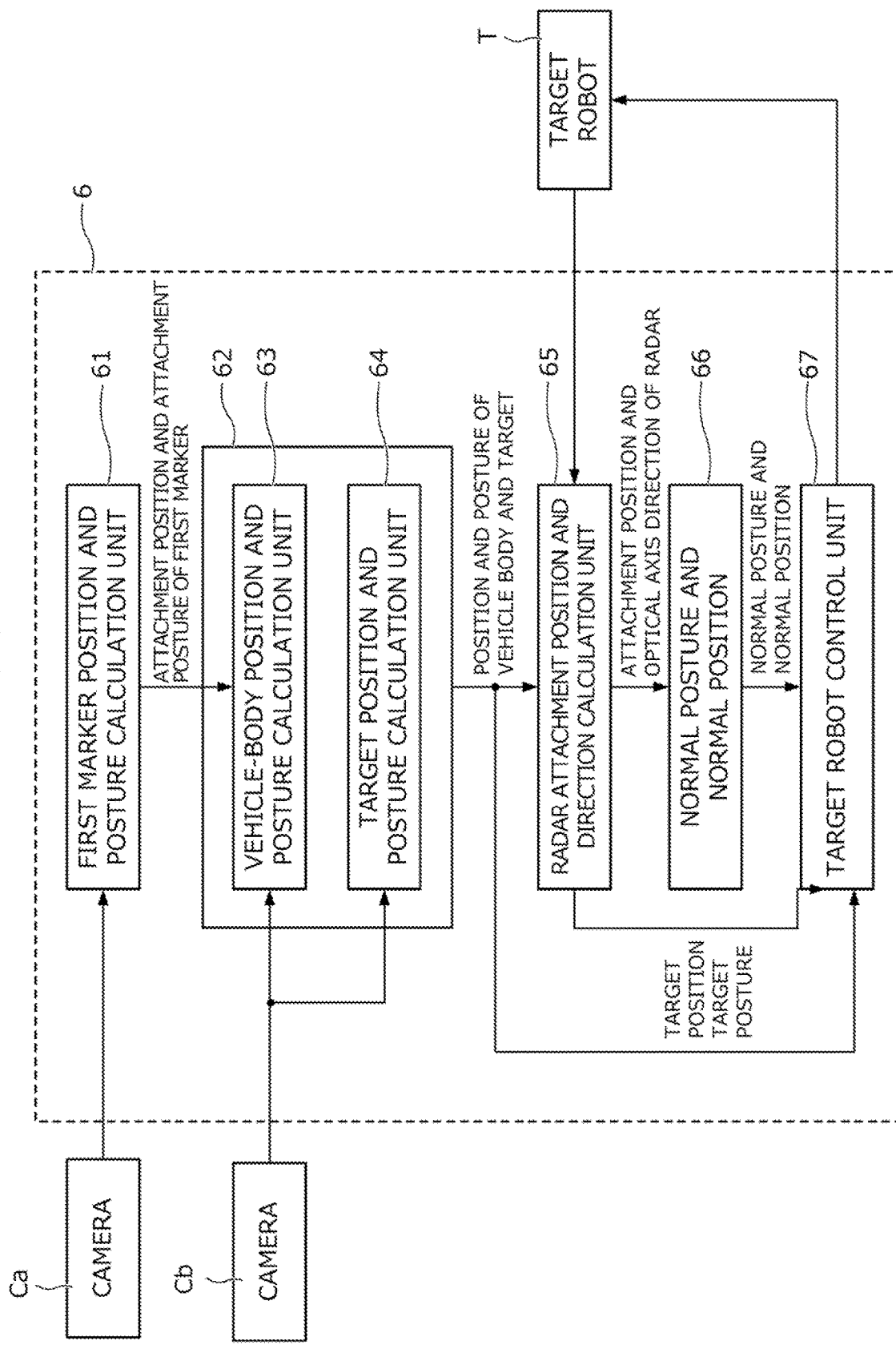
FIG. 8 is a functional block diagram of a control device.

FIG. 8 is a functional block diagram of the control device 6. The control device 6 is a computer including a CPU, a ROM, a RAM, a wireless communication interface, and the like. The control device 6 functions as a first marker position and posture calculation unit 61, a position and posture calculation unit 62, a radar attachment position and direction calculation unit 65, a normal posture calculation unit 66, and a target robot control unit 67 to be described later by executing various kinds of operation processing in the CPU in accordance with a program stored in the ROM.

The first marker position and posture calculation unit 61 calculates a position and a posture of the first marker M1 with reference to the inspection reference point Q defined on the axle Sh of the vehicle body B in a state of securing the confronting posture by the confronting devices 15L, 15R, 17L, and 17R by using image data transmitted from the six cameras Ca in the alignment tester process described with reference to FIG. 3. As described above, an attachment position or an attachment posture of the first marker M1 in the vehicle body B is slightly different for every vehicle V. Accordingly, the first marker position and posture calculation unit 61 calculates the position and the posture of the first marker M1 with reference to the inspection reference point Q in a state of securing the confronting posture for every vehicle V.

The position and posture calculation unit 62 includes a vehicle-body position and posture calculation unit 63 and a target position and posture calculation unit 64, and calculates a position and a posture of the vehicle body B and the target robots T in the inspection chamber Rb by using the units.

The vehicle-body position and posture calculation unit 63 calculates a position and a posture of the vehicle body B in the inspection chamber Rb by using the image data transmitted from the six camera Cb installed in the inspection chamber Rb, and the position and the posture of the first marker M1 with reference to the inspection reference point Q which are calculated by the first marker position and posture calculation unit 61. More specifically, the vehicle-body position and posture calculation unit 63 detects the position and the posture of the first marker M1 in the inspection chamber Rb by using the image data transmitted from the six cameras Cb, and calculates the position and the posture of the vehicle body B in the inspection chamber Rb by using the detection result of the position and the posture of the first marker M1 and the calculation result of the first marker position and posture calculation unit 61. The position and the posture of the vehicle body B which are calculated by the vehicle-body position and posture calculation unit 63 are transmitted to the radar attachment position and direction calculation unit 65, the normal posture calculation unit 66, and the target robot control unit 67.

The target position and posture calculation unit 64 calculates a position and a posture of the six target robots T in the inspection chamber Rb by using the image data transmitted from the six cameras Cb installed in the inspection chamber Rb. The above-described second marker M2 is attached at a predetermined position of each of the target robots T, and information relating to an attachment position and an attachment posture of the second marker M2 is stored in the target position and posture calculation unit 64. The target position and posture calculation unit 64 detects the position and the posture of the second marker M2 of the target robot T in the inspection chamber Rb by using the image data transmitted from the six cameras Cb, and calculates the position and the posture of the target robot T in the inspection chamber Rb by using the calculation result of the position and the posture of the second marker M2, and the information relating to the predetermined attachment position and attachment posture of the second marker M2. The position and the posture of the vehicle body B which are calculated by the target position and posture calculation unit 64 is transmitted to the radar attachment position and direction calculation unit 65, the normal posture calculation unit 66, and the target robot control unit 67.

The target robot control unit 67 controls the target robot T so that matching is established between the position and the posture of the target robot T which are calculated by the target position and posture calculation unit 64, and a target position and a target posture of the target robot T which are calculated in accordance with a procedure to be described later by the radar attachment position and direction calculation unit 65 or a normal inspection position and a normal inspection posture of the target robot T which are calculated in accordance with a procedure to be described later by the normal posture calculation unit 66.

The radar attachment position and direction calculation unit 65 calculates an attachment position of each of the radar devices R attached to the vehicle body B and a direction of an optical axis of the radar device R by using the position and the posture of the vehicle body B and the target robot T which are calculated by the position and posture calculation unit 62, and electromagnetic wave characteristic data transmitted from the electromagnetic wave characteristic measurement device 76 provided in the target robot T.

Figure 9:
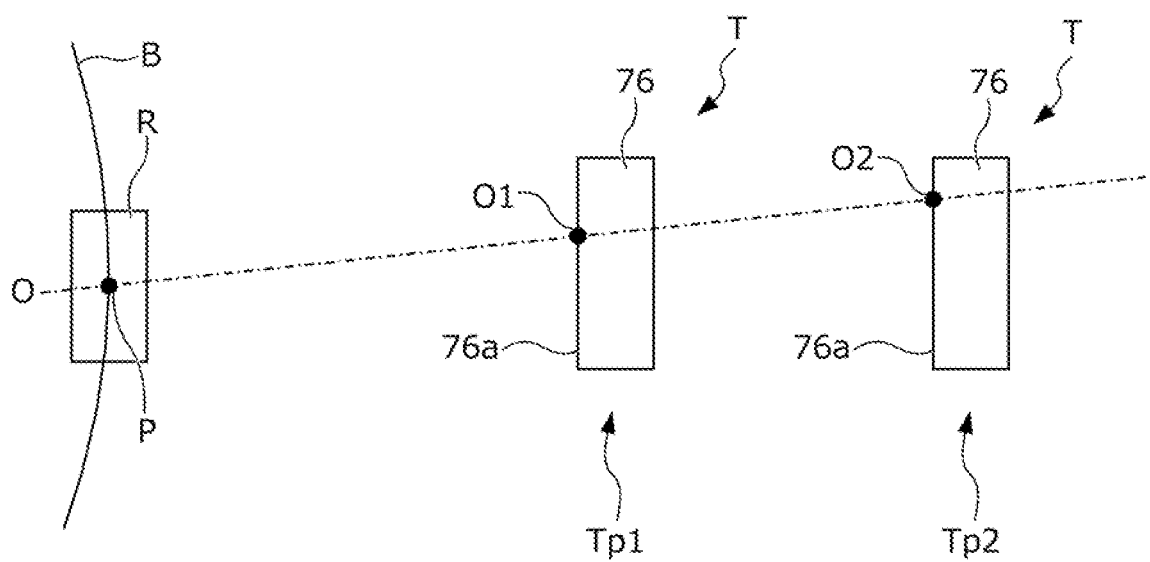
FIG. 9 is a view for describing a procedure of calculating an attachment position of a radar device and a direction of an optical axis in a radar attachment position and direction calculation unit.

FIG. 9 is a view for describing a procedure of calculating a position of an attachment point P of the radar device R and a direction of an optical axis O in the radar attachment position and direction calculation unit 65.

As illustrated in FIG. 9, the radar attachment position and direction calculation unit 65 changes a position of the target robot T between a first position Tp1 and a second position Tp2 that is further distant from the vehicle body B in comparison to the first position Tp1, and calculates a position of the attachment point P of the radar device R with respect to the vehicle body B in a three-dimensional space and a direction of the optical axis O in a three-dimensional space by using the electromagnetic wave characteristic data of the electromagnetic wave of the radar device R which is obtained by the target robot T installed at the positions Tp1 and Tp2.

More specifically, the radar attachment position and direction calculation unit 65 sets a target position of the target robot T to the first position Tp1, moves the target robot T to the first position Tp1 by using the target robot control unit 67, and calculates, for example, a position of a point at which an electromagnetic wave intensity becomes the maximum from the electromagnetic wave characteristic data obtained by the electromagnetic wave characteristic measurement device 76 of the target robot T installed at the first position Tp1. As described above, the position of the point at which the electromagnetic wave intensity calculated by the radar attachment position and direction calculation unit 65 becomes the maximum corresponds to an intersection O1 between the optical axis O and the electromagnetic wave incident surface 76a of the electromagnetic wave characteristic measurement device 76 of the target robot T installed at the first position Tp1.

In addition, the radar attachment position and direction calculation unit 65 sets the target position of the target robot T to the second position Tp2, moves the target robot T to the second position Tp2 by using the target robot control unit 67, and calculates, for example, a position of a point at which the electromagnetic wave intensity becomes the maximum from the electromagnetic wave characteristic data obtained by the electromagnetic wave characteristic measurement device 76 of the target robot T installed at the second position Tp2. As described above, the position of the point at which the electromagnetic wave intensity calculated by the radar attachment position and direction calculation unit 65 becomes the maximum corresponds to an intersection O2 between the optical axis O and the electromagnetic wave incident surface 76a of the electromagnetic wave characteristic measurement device 76 of the target robot T installed at the second position Tp2.

As described above, the radar attachment position and direction calculation unit 65 calculates a direction of the optical axis O as a line segment passing through the two intersections O1 and O2 by using the positions of the two intersections O1 and O2. In addition, the radar attachment position and direction calculation unit 65 calculates a position of the attachment point P of the radar device R by an intersection between an extension line of the line segment passing through the intersections O1 and O2 calculated as described above, and the vehicle body B. As described above, the radar attachment position and direction calculation unit 65 calculates the position of the attachment point P of the radar device R attached to the vehicle body B in a three-dimensional space, and a direction of the optical axis O in a three-dimensional space.

Returning to FIG. 8, the normal posture calculation unit 66 calculates a normal inspection position and a normal inspection posture with respect to the corner reflector 75 of the target robot T on the basis of the attachment position of the radar device R and the direction of the optical axis which are calculated by the radar attachment position and direction calculation unit 65. The target robot control unit 67 moves the target robot T to be the normal position and the normal posture which are calculated by the normal posture calculation unit 66. Here, the normal inspection position and the normal inspection posture correspond to a position and a posture of the corner reflector 75 of the target robot T to be installed to adjust the direction of the optical axis so that the direction of the optical axis of the radar device R becomes the normal direction.

Figure 10A:
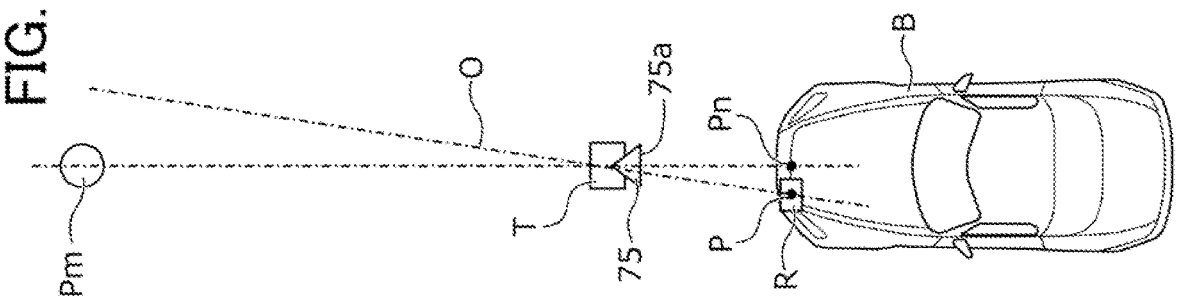
FIG. 10A is a view for describing a procedure of calculating a normal position and a normal posture of an adjustment target in a normal posture calculation unit.
Figure 10B:
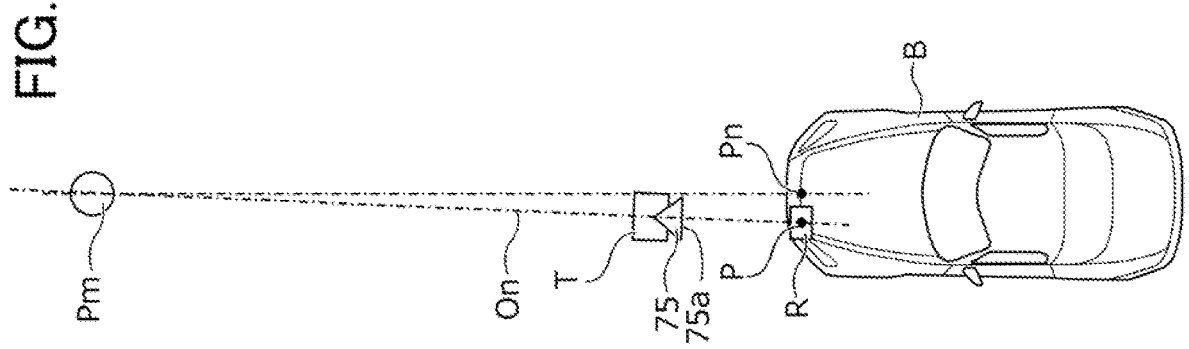
FIG. 10B is a view for describing a procedure of calculating the normal position and the normal posture of the adjustment target in the normal posture calculation unit.

FIG. 10A and FIG. 10B are views for describing a procedure of calculating the normal inspection position and the normal inspection posture of the corner reflector 75 in the normal posture calculation unit 66. Note that, FIG. 10A and FIG. 10B illustrate a case where the radar device R is attached to the vehicle body B at a position that extremely deviates from a designed attachment point Pn along a right and left direction for easy explanation. However, actually, the radar device R is attached at a position that deviates from the designed attachment point Pn along not only the right and left direction but also an upper and lower direction, but illustration on the deviation along the upper and lower direction will be omitted.

First, as illustrated in FIG. 10A and FIG. 10B, the longest target detection point Pm of the radar device R is set to a position that is distant from the designed attachment point Pn of the radar device R by a predetermined maximum detection distance (for example, 100 m). Note that, a position of the designed attachment point Pn in a three-dimensional space can be calculated on the basis of the position and the posture of the vehicle body B in the inspection chamber Rb which are calculated by the vehicle-body position and posture calculation unit 63. Accordingly, the position of the longest target detection point Pm in a three-dimensional space can also be calculated on the basis of the position and the posture of the vehicle body B in the inspection chamber Rb which are calculated by the vehicle-body position and posture calculation unit 63.

As illustrated in FIG. 10A, the radar device R is attached to the attachment point P that is spaced away from the designed attachment point Pn of the vehicle body B, and a direction of the optical axis O is not adjusted, and thus the optical axis O does not pass through the original longest target detection point Pm.

Therefore, the normal posture calculation unit 66 calculates a normal optical axis On that connects the attachment point P and the longest target detection point Pm by using a calculation result of the radar attachment position and direction calculation unit 65 as illustrated in FIG. 10B. In addition, the normal posture calculation unit 66 calculates the normal inspection position and the normal inspection posture of the corner reflector 75 so that the corner reflector 75 faces the radar device R on the normal optical axis On. More specifically, the normal posture calculation unit 66 calculates the normal inspection position and the normal inspection posture of the corner reflector 75 so that the reflection surface 75a of the corner reflector 75 provided in the target robot T becomes orthogonal to the normal optical axis On, and the normal optical axis On intersects the center of the reflection surface 75a. According to this, the normal posture calculation unit 66 can calculate the normal inspection position and the normal inspection posture of the corner reflector 75 to face the radar device R between the radar device R attached to the attachment point P and the longest target detection point Pm.

Figure 11:
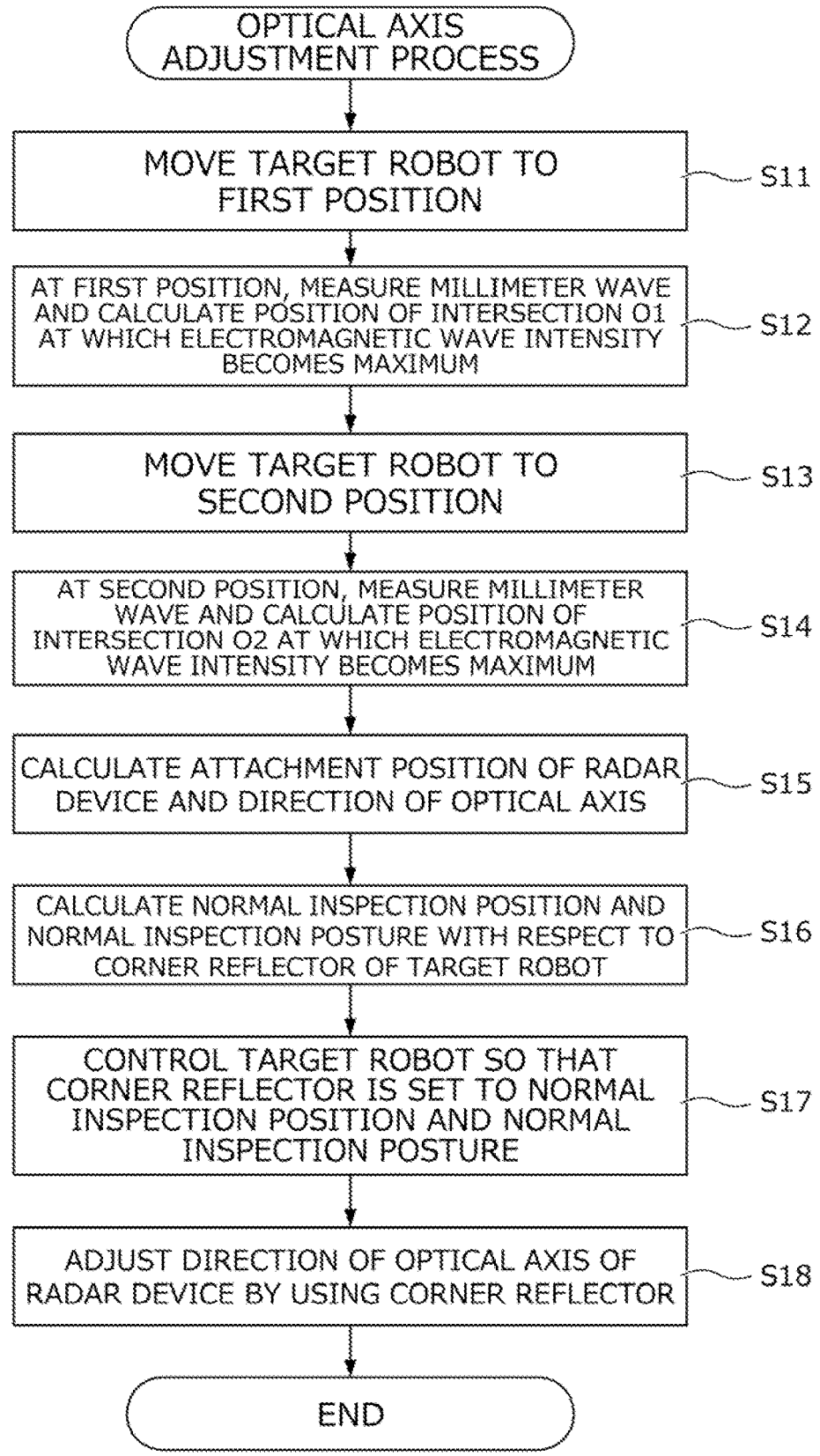
FIG. 11 is a flowchart illustrating a specific procedure of a process of adjusting an optical axis of the radar device by using an optical axis adjustment system.

FIG. 11 is a flowchart illustrating a specific procedure of a process of adjusting the optical axis of the radar device R using the optical axis adjustment system 3 described above. As described above, a total of six radar devices R are attached to the vehicle body B. FIG. 11 illustrates a procedure of setting one of the six radar devices R as a target and adjusting an axis thereof.

First, in S11, the radar attachment position and direction calculation unit 65 of the control device 6 moves the target robot T determined in advance for the radar device R set as a target to the first position Tp1 that is determined in advance, and makes the electromagnetic wave incident surface 76a of the electromagnetic wave characteristic measurement device 76 provided in the target robot T face the radar device R at the first position Tp1.

Next, in S12, an operator operates the vehicle inspection device 5 to emit an electromagnetic wave from the radar device R and to receive the electromagnetic wave by the electromagnetic wave characteristic measurement device 76. In addition, the radar attachment position and direction calculation unit 65 calculates a position of the intersection O1 that is a point at which the electromagnetic wave intensity becomes the maximum by using the electromagnetic wave characteristic data transmitted from the electromagnetic wave characteristic measurement device 76.

Next, in S13, the radar attachment position and direction calculation unit 65 moves the target robot T to the second position Tp2 away from the radar device R. Next, in S14, the operator operates the vehicle inspection device 5 to emit an electromagnetic wave from the radar device R and to receive the electromagnetic wave by the electromagnetic wave characteristic measurement device 76. In addition, the radar attachment position and direction calculation unit 65 calculates a position of the intersection O2 that is a point at which the electromagnetic wave intensity becomes the maximum by using the electromagnetic wave characteristic data transmitted from the electromagnetic wave characteristic measurement device 76.

In S15, the radar attachment position and direction calculation unit 65 calculates a position of the attachment point P of the radar device R attached to the vehicle body B in a three-dimensional space and a direction of the optical axis O in a three-dimensional space by using positions of the two intersections O1 and O2.

In S16, the normal posture calculation unit 66 calculates a normal inspection position and a normal inspection posture of the corner reflector 75 of the target robot T on the basis of the position of the attachment point P of the radar device R and the direction of the optical axis O which are calculated by the radar attachment position and direction calculation unit 65.

In S17, the target robot control unit 67 controls the target robot T so that matching is established between the position and the posture of the corner reflector 75 of the target robot T which are calculated by the target position and posture calculation unit 64, and the normal inspection position and the normal inspection posture of the corner reflector 75 which are calculated by the normal posture calculation unit 66. According to this, the corner reflector 75 of the target robot T is provided at the normal inspection position and in the normal inspection posture which are determined in correspondence with the attachment position of the radar device R set as a target and the direction of optical axis.

In S18, the operator adjusts the direction of the optical axis O of the radar device R by using the corner reflector 75 provided at the normal inspection position and in the normal inspection posture as described above. More specifically, the electromagnetic wave is emitted from the radar device R, and the electromagnetic wave reflected by the corner reflector 75 is received by the radar device R. According to this, a deviation between the optical axis O of the radar device R and the normal optical axis On is understood, and the direction of the optical axis O of the radar device R is adjusted so that the deviation disappears.

As described above, the process of adjusting the optical axis of the radar device R by using the target robot T is divided into a first-half process of calculating the attachment position of the radar device R and the direction of the optical axis by using the target robot T (refer to S11 to S15 in FIG. 11), and a second-half process of calculating the normal inspection position and the normal inspection posture with respect to the corner reflector 75 of the target robot T based on the calculation result, controlling the target robot T so that the corner reflector 75 is set to the normal inspection position and the normal inspection posture, and adjusting the direction of the optical axis of the radar device R by using the corner reflector 75 (refer to S16 to S18 in FIG. 11).

Figure 12:
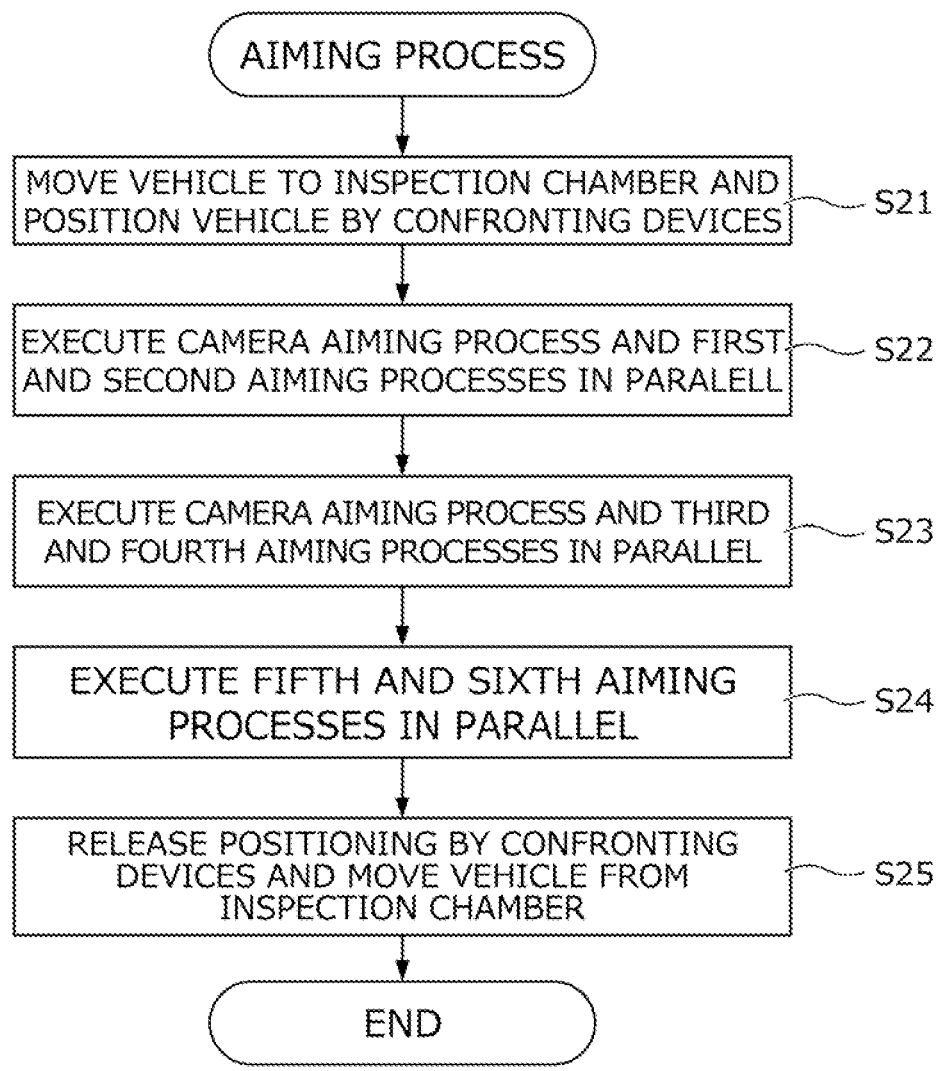
FIG. 12 is a flowchart illustrating a specific procedure of an aiming process of adjusting an optical axis of six radar devices and an in-vehicle camera.

Next, a specific procedure of aiming processes of adjusting an optical axis of the six radar devices R mounted on the vehicle V and the in-vehicle camera C by using the optical axis adjustment system 3 will be described. FIG. 12 is a flowchart illustrating a specific procedure of the aiming processes, and FIG. 13A to FIG. 13D are views schematically illustrating the specific procedure of the aiming processes.

Figure 13A:
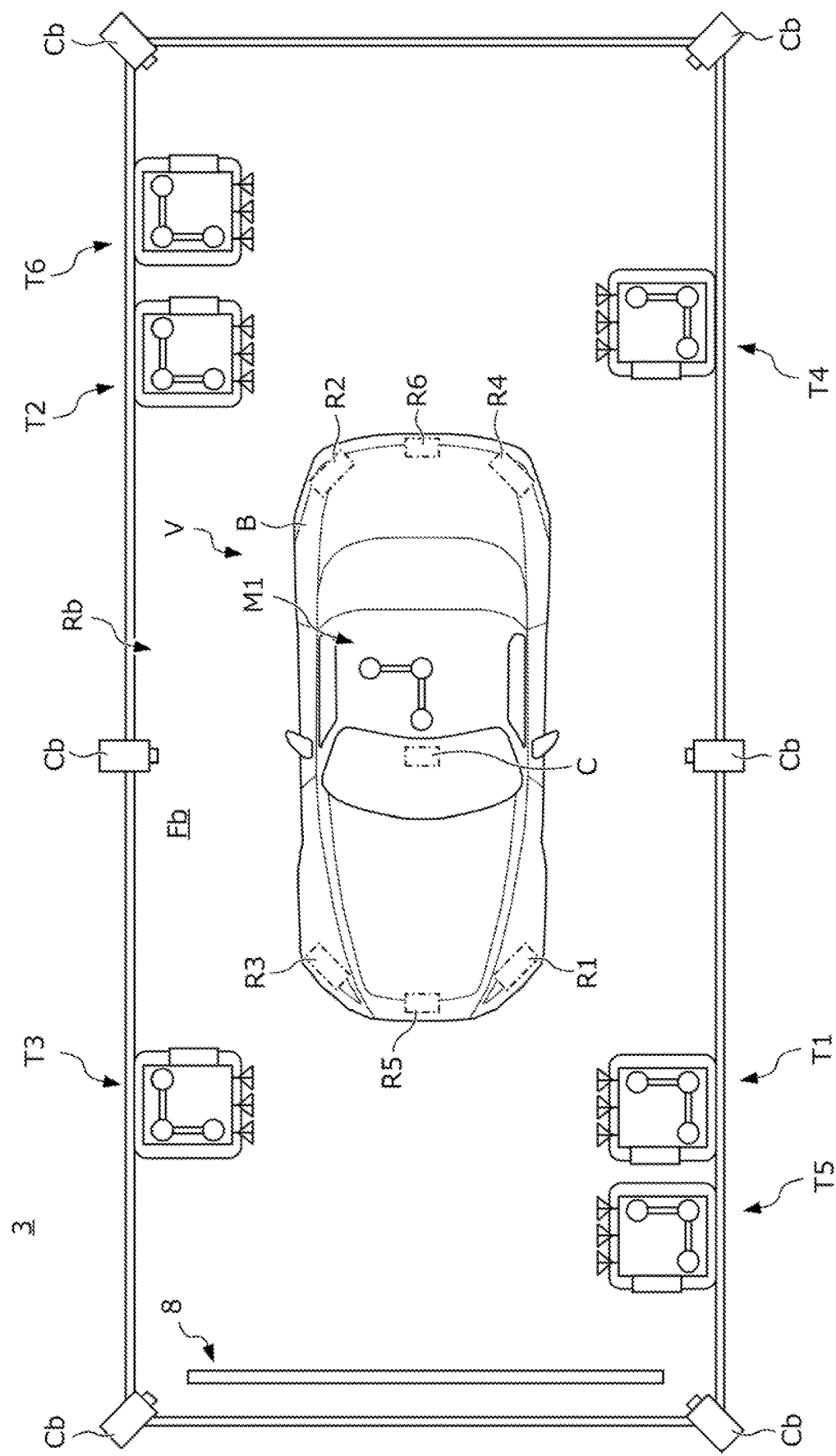
FIG. 13A is a view schematically illustrating a specific procedure of the aiming process.

As illustrated in FIG. 13A, six radar devices R1, R2, R3, R4, R5, and R6 and one in-vehicle camera C are attached to the vehicle body B of the vehicle V as an external environment sensor in which adjustment of an optical axis is necessary. The in-vehicle camera C is attached to approximately the center of the vehicle body B in a plan view, more specifically, a windshield.

A first radar device R1 is provided a leftward portion on a front side of the vehicle body B, and a second radar device R2 is provided a rightward portion on a rear side of the vehicle body B. That is, the first radar device R1 and the second radar device R2 are attached to positions opposite to each other with the center of the vehicle body B in a plan view interposed therebetween.

A third radar device R3 is provided a rightward portion on the front side of the vehicle body B, and a fourth radar device R4 is provided at a leftward portion on the rear side of the vehicle body B. That is, the third radar device R3 and the fourth radar device R4 are attached to portions opposite to each other with the center of the vehicle body B in a plan view interposed therebetween.

A fifth radar device R5 is provided at the central portion on the front side of the vehicle body B, and a sixth radar device R6 is provided at the central portion on the rear side of the vehicle body B. That is, the fifth radar device R5 and the sixth radar device R6 are attached to portions opposite to each other with the center of the vehicle body B in a plan view interposed therebetween.

In addition, as illustrated in FIG. 13A, a first target robot T1 with respect to the first radar device R1, a second target robot T2 with respect to the second radar device R2, a third target robot T3 with respect to the third radar device R3, a fourth target robot T4 with respect to the fourth radar device R4, a fifth target robot T5 with respect to the fifth radar device R5, a sixth target robot T6 with respect to the sixth radar device R6, and the camera inspection device 8 with respect to the in-vehicle camera C are installed in the inspection chamber Rb.

In the flowchart in FIG. 12, first, in S21, an operator moves the vehicle V after being subjected to the alignment tester process in FIG. 3 into the inspection chamber Rb, and positions the vehicle V to a predetermined vehicle inspection position by the confronting devices.

Figure 13B:
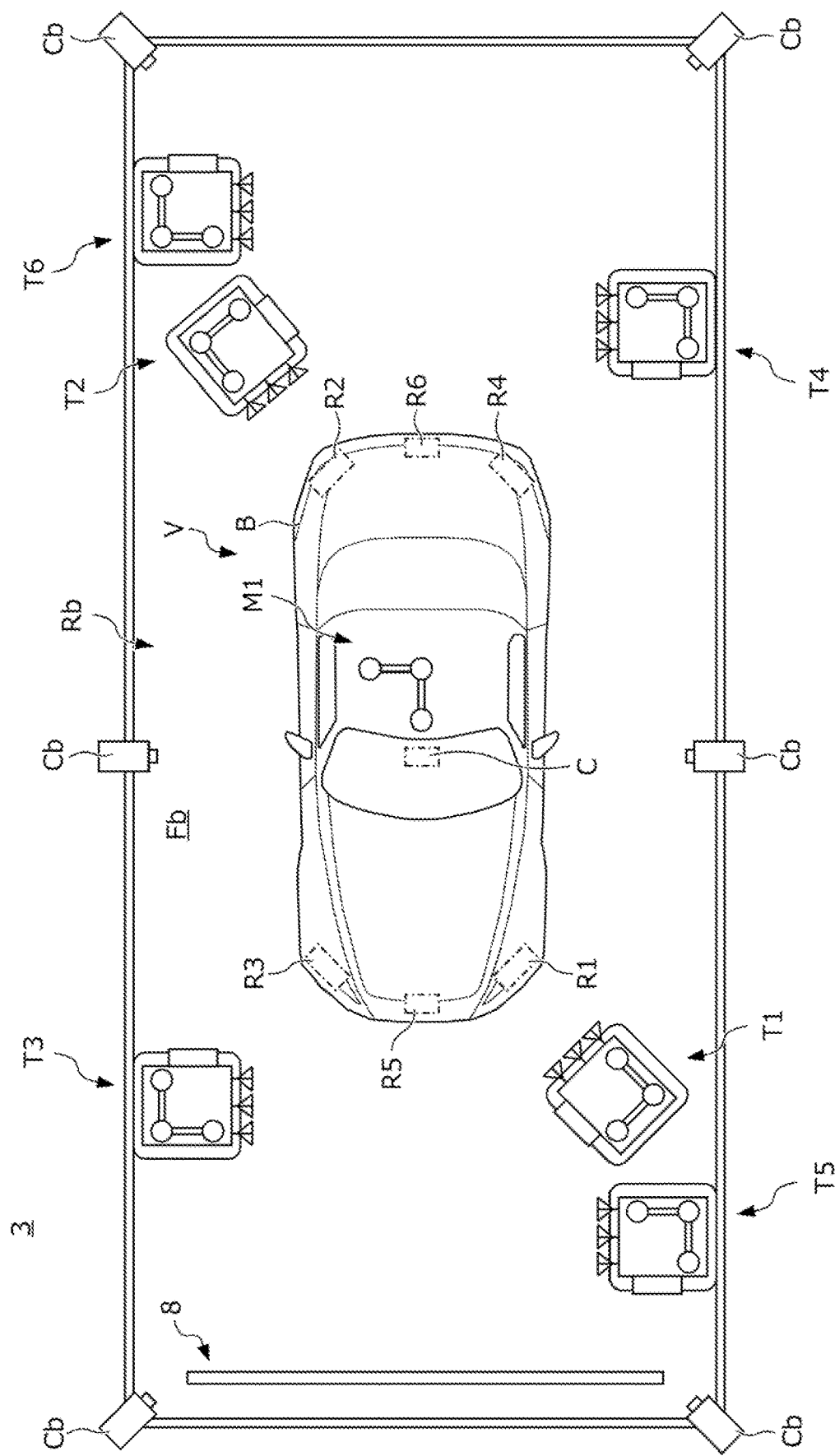
FIG. 13B is a view schematically illustrating a specific procedure of the aiming process.

In S22, as illustrated in FIG. 13B, three aiming processes including a camera aiming process of adjusting an optical axis of the in-vehicle camera C by using the camera inspection device 8, a first aiming process of adjusting an optical axis of the first radar device R1 by using the first target robot T1, and a second aiming process of adjusting an optical axis of the second radar device R2 by using the second target robot T2 are executed in parallel, and when at least the first aiming process and the second aiming process among the three aiming processes are terminated, the process transitions to S23.

In the camera aiming process, first, the target board 81 is set to a predetermined inspection position by lowering the target board 81 along the sliding rail 83, and then the inspection surface 81a of the target board 81 set to the inspection position is imaged by the in-vehicle camera C to adjust the optical axis of the in-vehicle camera C.

In addition, in the first aiming process, the optical axis of the first radar device R1 is adjusted by executing the optical axis adjustment process described with reference to FIG. 11 by using the first target robot T1 and the first radar device R1 in combination. In addition, in the second aiming process, the optical axis of the second radar device R2 is adjusted by executing the optical axis adjustment process described with reference to FIG. 11 by using the second target robot T2 and the second radar device R2 in combination.

Here, it is not necessary to simultaneously initiate or terminate the first aiming process and the second aiming process, but it is preferable that at least parts of an execution period of the first aiming process and an execution period of the second aiming process overlap each other.

In addition, it is not necessary to simultaneously initiate or terminate the camera aiming process, and the first and second aiming processes, but it is preferable that at least one of the execution period of the first aiming process and the execution period of the second aiming process, and an execution period of the camera aiming process at least partially overlap each other.

In addition, as illustrated in FIG. 13B, it is preferable that in the first aiming process, a position at which the first target robot T1 is installed is determined within a viewing angle of the first radar device R1 and out of a viewing angle of the second radar device R2, and in the second aiming process, a position at which the second target robot T2 is installed is determined within the viewing angle of the second radar device R2 and out of the viewing angle of the first radar device R1.

Figure 13C:
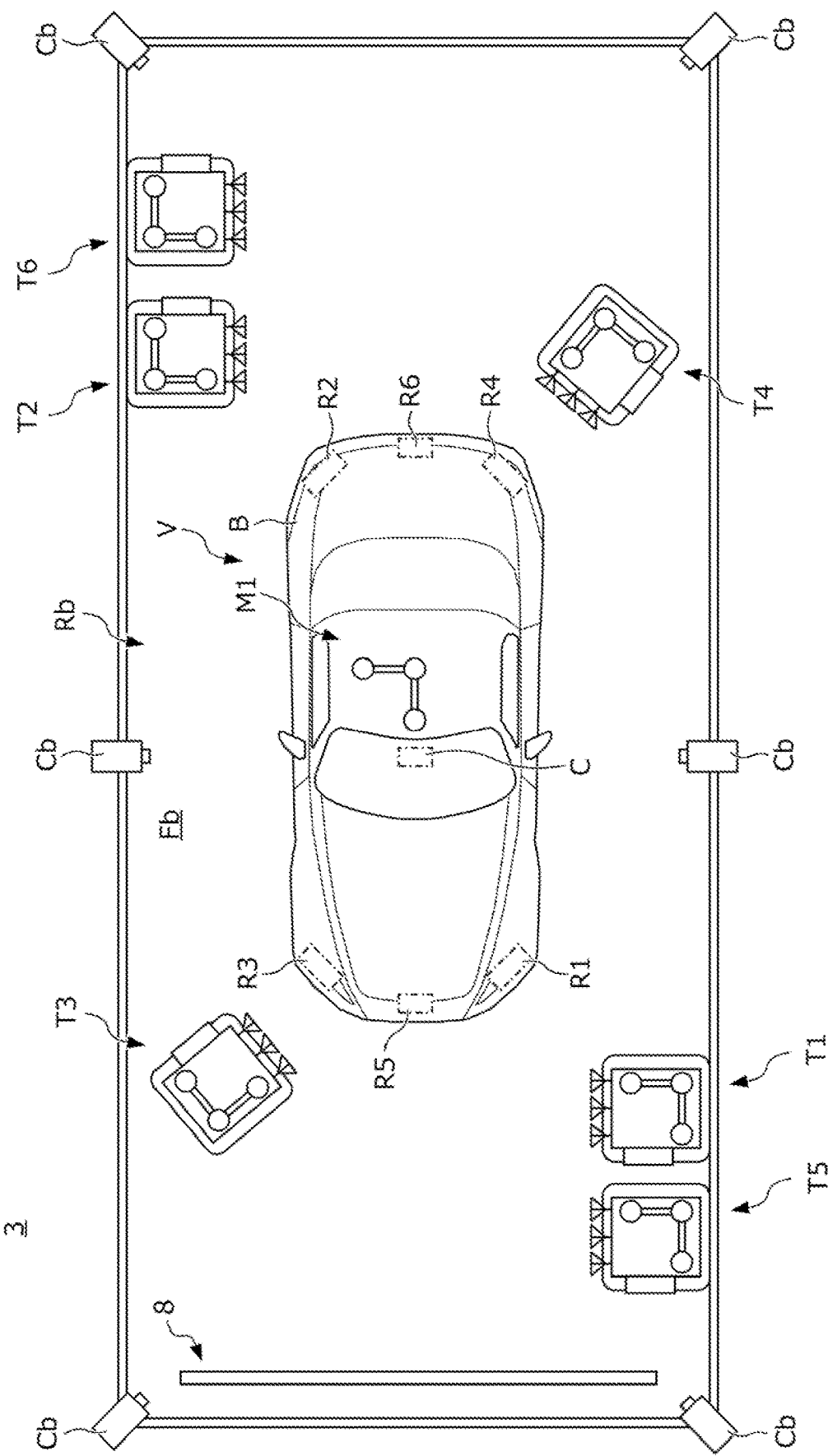
FIG. 13C is a view schematically illustrating a specific procedure of the aiming process.

Next, in S23, as illustrated in FIG. 13C, in a case where adjustment of the optical axis of the in-vehicle camera C using the camera inspection device 8 is not completed, the adjustment is subsequently executed, a third aiming process of adjusting an optical axis of a third radar device R3 by using a third target robot T3, and a fourth aiming process of adjusting an optical axis of a fourth radar device R4 by using a fourth target robot T4 are executed in parallel, and when at least the third aiming process and the fourth aiming process among the three aiming processes are terminated, the process transitions to S24.

Here, in the third aiming process, the optical axis of the third radar device R3 is adjusted by executing the optical axis adjustment process described with reference to FIG. 11 by using the third target robot T3 and the third radar device R3 in combination. In addition, in the fourth aiming process, the optical axis of the fourth radar device R4 is adjusted by executing the optical axis adjustment process described with reference to FIG. 11 by using the fourth target robot T4 and the fourth radar device R4 in combination.

Here, it is not necessary to simultaneously initiate or terminate the third aiming process and the fourth aiming process, but it is preferable that at least parts of an execution period of the third aiming process and an execution period of the fourth aiming process overlap each other.

In addition, as illustrated in FIG. 13C, it is preferable that in the third aiming process, a position at which the third target robot T3 is installed is determined within a viewing angle of the third radar device R3 and out of a viewing angle of the fourth radar device R4, and in the fourth aiming process, a position at which the fourth target robot T4 is installed is determined within the viewing angle of the fourth radar device R4 and out of the viewing angle of the third radar device R3.

Figure 13D:
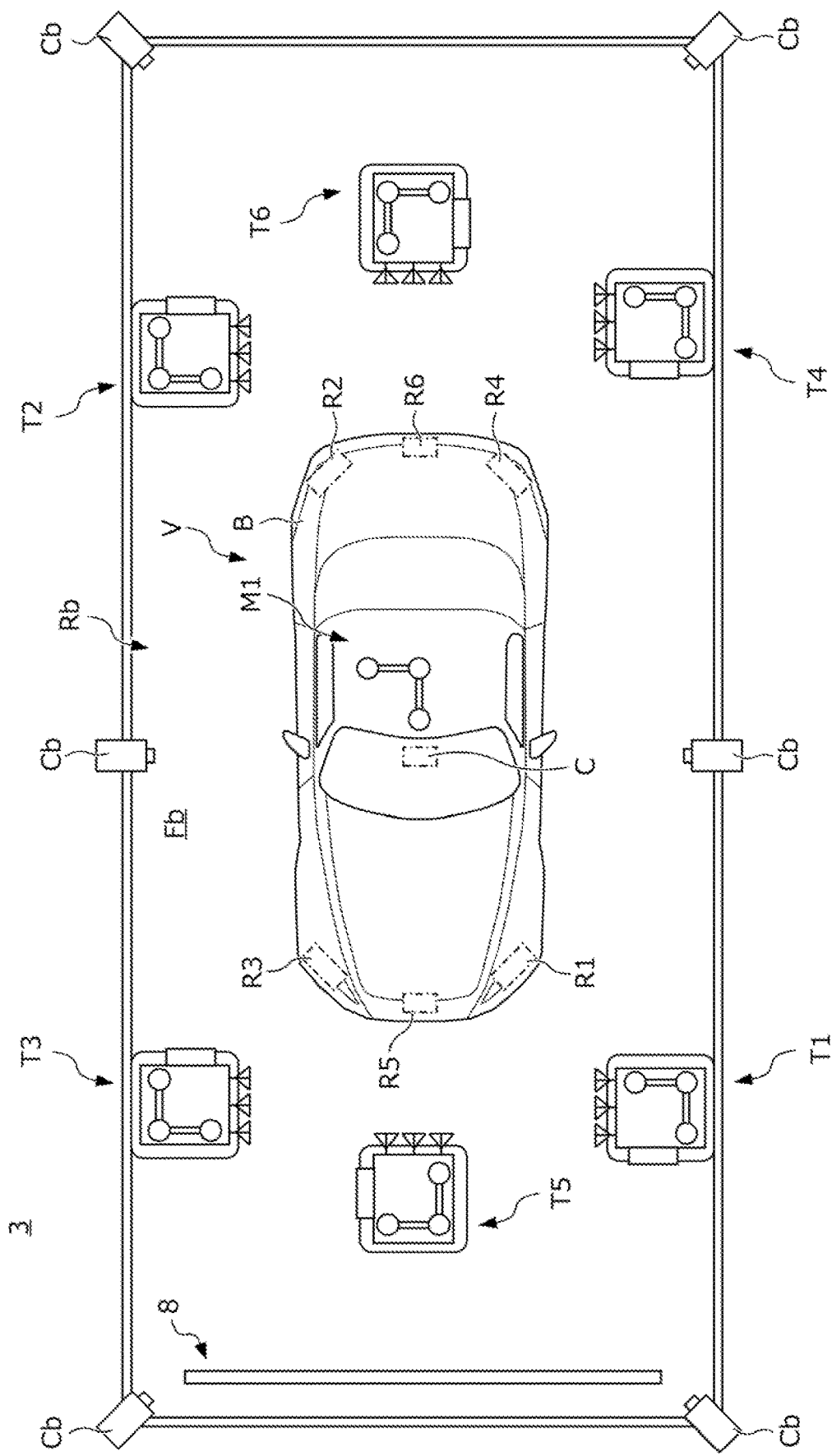
FIG. 13D is a view schematically illustrating a specific procedure of the aiming process.

Next, as illustrated in FIG. 13D, in S24, a fifth aiming process of adjusting an optical axis of a fifth radar device R5 by using a fifth target robot T5, and a sixth aiming process of adjusting an optical axis of a sixth radar device R6 by using a sixth target robot T6 are executed in parallel, and when the fifth aiming process and the sixth aiming process are terminated, the process transitions to S25.

Here, in the fifth aiming process, the optical axis of the fifth radar device R5 is adjusted by executing the optical axis adjustment process described with reference to FIG. 11 by using the fifth target robot T5 and the fifth radar device R5 in combination. In addition, in the sixth aiming process, the optical axis of the sixth radar device R6 is adjusted by executing the optical axis adjustment process described with reference to FIG. 11 by using the sixth target robot T6 and the sixth radar device R6 in combination.

Here, it is not necessary to simultaneously initiate or terminate the fifth aiming process and the sixth aiming process, but it is preferable that at least parts of an execution period of the fifth aiming process and an execution period of the sixth aiming process overlap each other.

In addition, as illustrated in FIG. 13D, it is preferable that in the fifth aiming process, a position at which the fifth target robot T5 is installed is determined within a viewing angle of the fifth radar device R5 and out of a viewing angle of the sixth radar device R6, and in the sixth aiming process, a position at which the sixth target robot T6 is installed is determined within the viewing angle of the sixth radar device R6 and out of the viewing angle of the fifth radar device R5.

In S25, the operator releases constraint of the vehicle V by the confronting devices, and conveys the vehicle V from the inspection chamber Rb and terminates the process illustrated in FIG. 12.

Second Embodiment

Next, a vehicle inspection system according to a second embodiment of the invention will be described with reference to the accompanying drawings. The vehicle inspection system according to this embodiment is different from the vehicle inspection system S according to the first embodiment mainly in a procedure of the aiming processes. Note that, in the following description, the same reference numeral will be given to the same configuration as in the first embodiment, and detailed description thereof will be omitted.

Figure 15A:
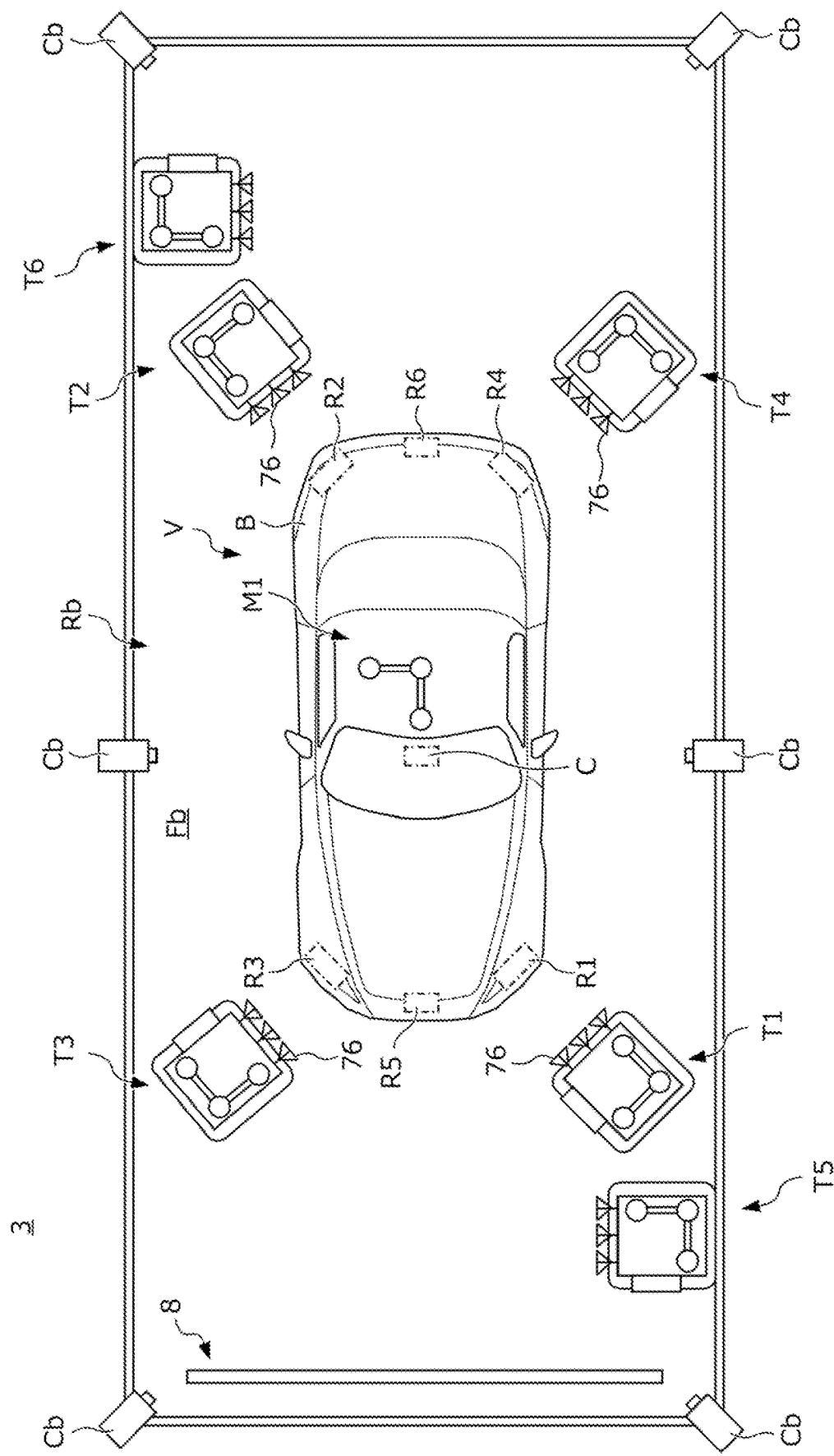
FIG. 15A is a view schematically illustrating a specific procedure of the aiming process.
Figure 15B:
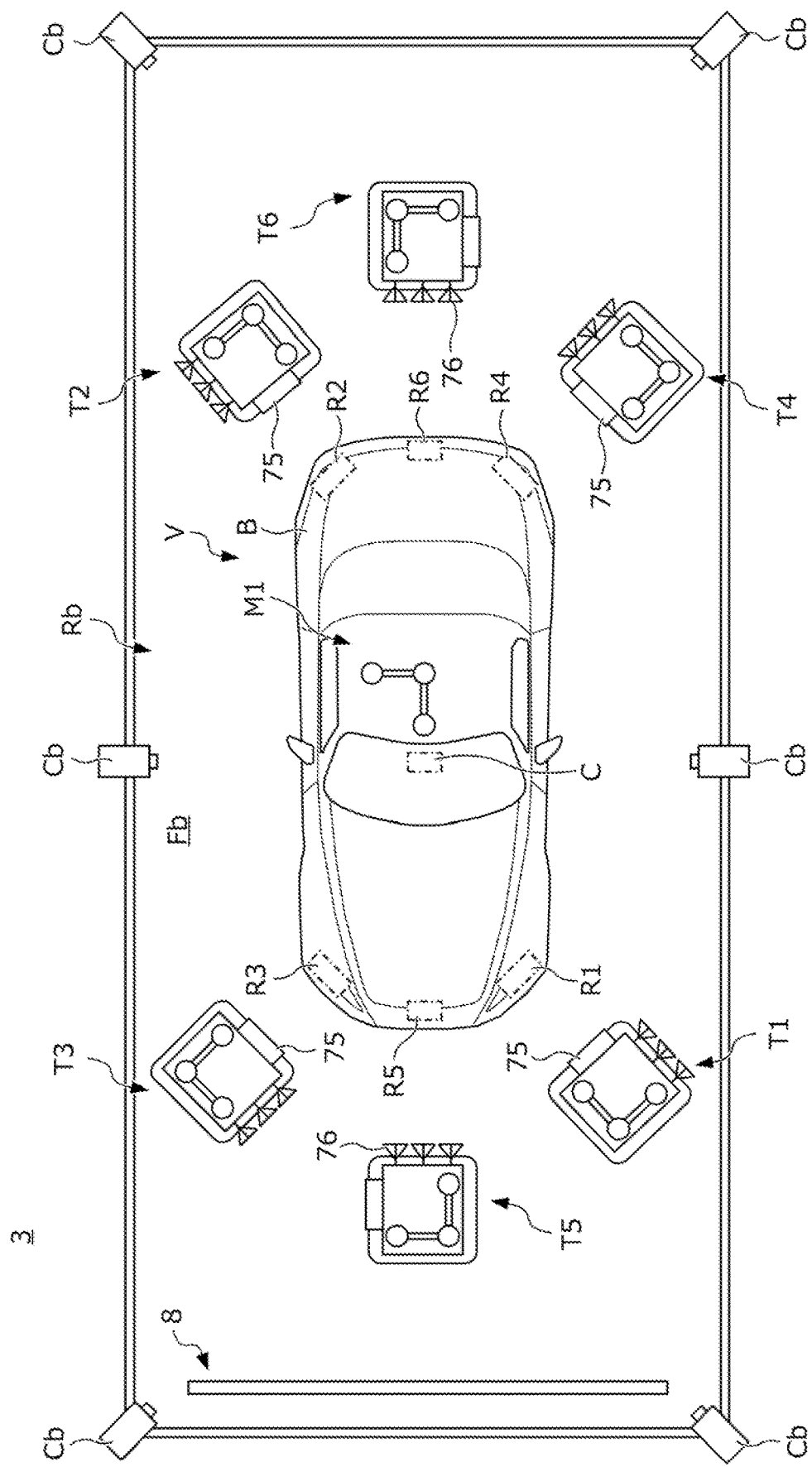
FIG. 15B is a view schematically illustrating a specific procedure of the aiming process.
Figure 15C:
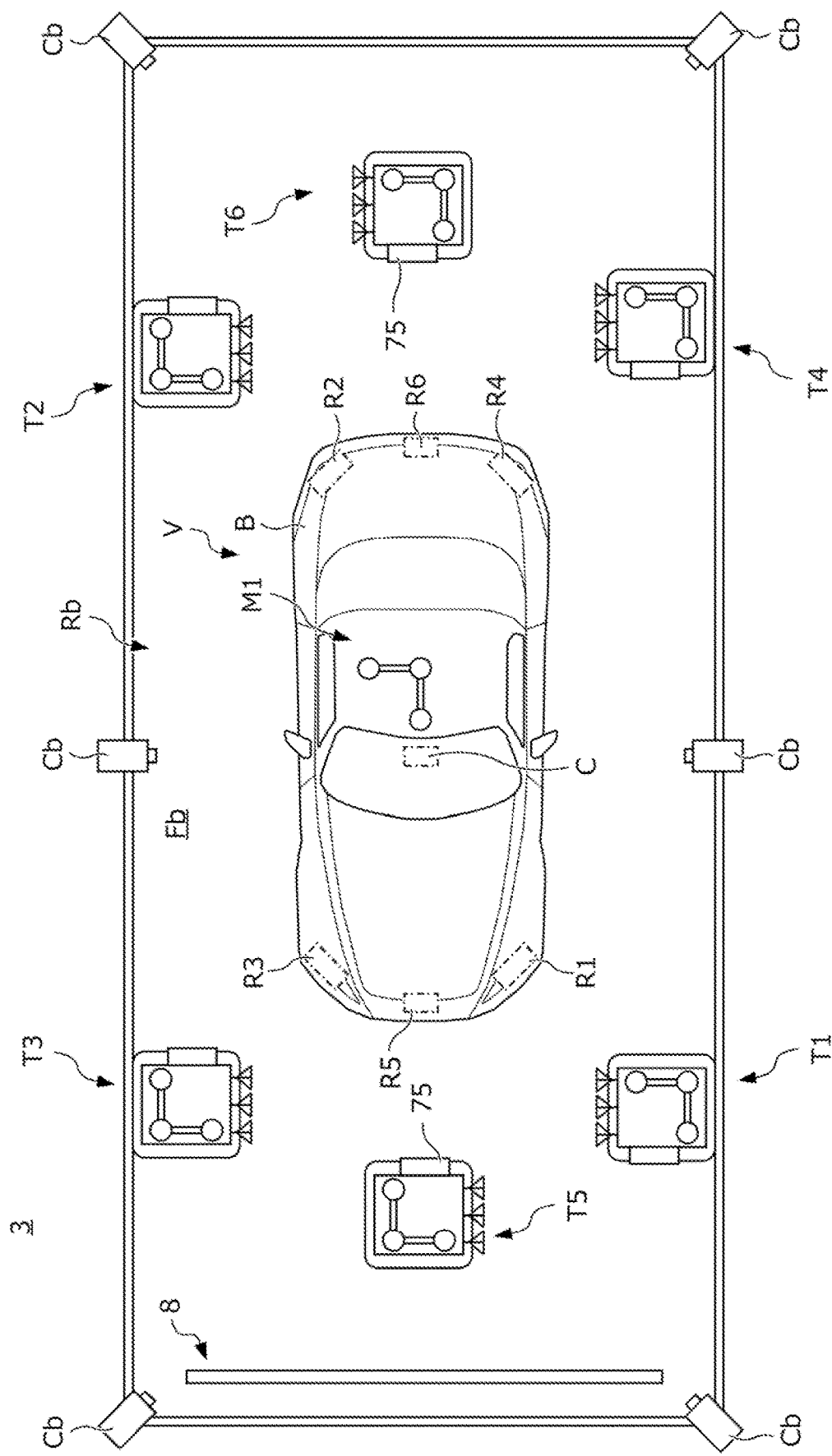
FIG. 15C is a view schematically illustrating a specific procedure of the aiming process.

FIG. 14 is a flowchart illustrating a specific procedure of aiming processes of adjusting the optical axis of the six radar devices R and the in-vehicle camera C which are mounted on the vehicle V in the vehicle inspection system according to this embodiment. FIG. 15A to FIG. 15C are views schematically illustrating a specific procedure of the aiming processes.

In the flowchart of FIG. 14, first, in S31, an operator moves the vehicle V after being subjected to the alignment tester process in FIG. 3 into the inspection chamber Rb, and positions the vehicle V to a predetermined vehicle inspection position by the confronting devices.

In S32, as illustrated in FIG. 15A, five aiming processes including a camera aiming process of adjusting an optical axis of the in-vehicle camera C by using the camera inspection device 8, a first aiming process of adjusting an optical axis of a first radar device R1 by using a first target robot T1, a second aiming process of adjusting an optical axis of a second radar device R2 by using a second target robot T2, a third aiming process of adjusting an optical axis of a third radar device R3 by using a third target robot T3, a fourth aiming process of adjusting an optical axis of a fourth radar device R4 by using a fourth target robot T4 are executed in parallel. In addition, when in S32, the first-half process of calculating the attachment position and the direction of the optical axis of the first to fourth radar devices R1 to R4 is completed in the first to fourth aiming processes, and the camera aiming process is completed, the process transitions to S33.

In the camera aiming process, first, the target board 81 is lowered along the sliding rail 83 to set the target board 81 to a predetermined inspection position, and the inspection surface 81a of the target board 81 set to the inspection position is imaged with the in-vehicle camera C to adjust the optical axis of the in-vehicle camera C.

In addition, as illustrated in FIG. 15A, in the first to fourth aiming processes, the electromagnetic wave characteristic measurement device 76 of each of the first to fourth target robots T1 to T4 is made to face each of the first to fourth radar devices R1 to R4 to execute the processes of S11 to S15 in the optical axis adjustment process described with reference to FIG. 11.

Here, it is not necessary for all of the first to fourth aiming processes to be simultaneously initiated, but it is preferable that execution periods of the first to fourth aiming processes at least partially overlap each other.

In addition, it is not necessary for the camera aiming process and the first to fourth aiming processes to be simultaneously initiated or terminated, but it is preferable that at least any one of the execution periods of the first to fourth aiming processes and an execution period of the camera aiming process at least partially overlap each other.

In addition, as illustrated in FIG. 15A, in the first aiming process, it is preferable that a position at which the first target robot T1 is installed is determined within a viewing angle of the first radar device R1 and out of a viewing angle of the second to fourth radar devices R2 to R4. In the second aiming process, it is preferable that a position at which the second target robot T2 is installed is determined within the viewing angle of the second radar device R2 and out of the viewing angle of the first radar device R1 and out of the viewing angle of the third and fourth radar devices R3 to R4. In the third aiming process, it is preferable that a position at which the third target robot T3 is installed is determined within the viewing angle of the third radar device R3 and out of the viewing angle of the first and second radar devices R1 and R2 and out of the viewing angle of the fourth radar device R4. In the fourth aiming process, it is preferable that a position at which the fourth target robot T4 is installed is determined within the viewing angle of the fourth radar device R4 and out of the viewing angle of the first to third radar devices R1 to R3.

Next, in S33, as illustrated in FIG. 15B, the first to sixth aiming processes are executed in parallel. In addition, when in S33, when a second-half process of adjusting the direction of the optical axis of the first to fourth radar devices R1 to R4 is completed in the first to fourth aiming processes, and a first-half process of calculating an attachment position and a direction of an optical axis of the fifth and sixth radar devices R5 and R6 are completed in the fifth and sixth aiming processes, the process transitions to S34.

In addition, as illustrated in FIG. 15B, in the first to fourth aiming processes, the corner reflector 75 of each of the first to fourth target robots T1 to T4 is made to face each of the first to fourth radar devices R1 to R4 to execute the processes of S16 to S18 in the optical axis adjustment process described with reference to FIG. 11. In addition, in the fifth and sixth aiming processes, the electromagnetic wave characteristic measurement device 76 of each of the fifth and sixth target robots T5 and T6 is made to face each of the fifth and sixth radar devices R5 to R6 to execute the processes of S11 to S15 in the optical axis adjustment process described with reference to FIG. 11.

Here, it is not necessary for the first to sixth aiming processes to be simultaneously initiated, but it is preferable that execution periods of the first to sixth aiming processes at least partially overlap each other.

In addition, as illustrated in FIG. 15B, in the first aiming process, it is preferable that a position at which the first target robot T1 is installed is determined within a viewing angle of the first radar device R1 and out of a viewing angle of the second to sixth radar devices R2 to R6. In the second aiming process, it is preferable that a position at which the second target robot T2 is installed is determined within the viewing angle of the second radar device R2 and out of the viewing angle of the first radar device R1 and out of the viewing angle of the third to sixth radar devices R3 to R6. In the third aiming process, it is preferable that a position at which the third target robot T3 is installed is determined within the viewing angle of the third radar device R3, out of the viewing angle of the first and second radar devices R1 and R2, and out of the viewing angle of the fourth to sixth radar devices R4 to R6. In the fourth aiming process, it is preferable that a position at which the fourth target robot T4 is installed is determined within the viewing angle of the fourth radar device R4, out of the viewing angle of the first to third radar devices R1 to R3, and out of the viewing angle of the fifth and sixth radar devices R5 and R6. In the fifth aiming process, it is preferable that a position at which the fifth target robot T5 is installed is determined within the viewing angle of the fifth radar device R5, out of the viewing angle of the first to fourth radar devices R1 to R4, and out of the viewing angle of the sixth radar device R6. In the sixth aiming process, it is preferable that a position at which the sixth target robot T6 is installed is determined within the viewing angle of the sixth radar device R6 and out of the viewing angle of the first to fifth radar devices R1 to R5.

Next, in S34, as illustrated in FIG. 15C, the fifth and sixth aiming processes are executed in parallel. When in S34, in the fifth and sixth aiming processes, when a second-half process of adjusting a direction of an optical axis of the fifth and sixth radar devices R5 and R6 is completed, the process transitions to S35.

In addition, as illustrated in FIG. 15C, in the fifth and sixth aiming processes, the corner reflector 75 of each of the fifth and sixth target robots T5 and T6 is made to face each of the fifth and sixth radar devices R5 and R6 to execute the processes of S16 to S18 in the optical axis adjustment process described with reference to FIG. 11.

Here, it is not necessary for all of the fifth and sixth aiming processes to be simultaneously initiated, but it is preferable that execution periods of the fifth and sixth aiming processes at least partially overlap each other.

In addition, as illustrated in FIG. 15C, in the fifth aiming process, it is preferable that a position at which the fifth target robot T5 is installed is determined within a viewing angle of the fifth radar device R5 and out of a viewing angle of the sixth radar device R6. In addition, in the sixth aiming process, it is preferable that a position at which the sixth target robot T6 is installed is determined within a viewing angle of the sixth radar device R6 and out of a viewing angle of the fifth radar device R5.

Next, in S35, the operator releases the constraint of the vehicle V by the confronting devices, and conveys the vehicle V from the inspection chamber Rb and terminates the process illustrated in FIG. 14.

Hereinbefore, an embodiment of the invention has been described, but the invention is not limited thereto. Detailed configurations may be appropriately changed in a range of the gist of the invention.

For example, in the embodiment, description has been given of a case where the optical axis of the in-vehicle camera C is adjusted by using the target board 81 of the camera inspection device 8 in the aiming process, but the invention is not limited thereto. The optical axis of the in-vehicle camera C can be adjusted by using the first target board 77 mounted on the target robot T instead of the target board 81 of the camera inspection device 8. In addition, in this case, the target robot T is moved to a position determined on the basis of the inspection reference point Q of the vehicle body B in the inspection chamber Rb so that the first target board 77 and the in-vehicle camera C confront to each other with a predetermined interval. In this manner, in the case of using the first target board 77 that is movable in the inspection chamber Rb, it is not necessary to maintain the vehicle body B in a confronting posture, and thus it is possible to adjust the optical axis of the in-vehicle camera C without using the confronting devices.

EXPLANATION OF REFERENCE NUMERALS

S VEHICLE INSPECTION SYSTEM
3 OPTICAL AXIS ADJUSTMENT SYSTEM
Rb INSPECTION CHAMBER
Cb CAMERA
V VEHICLE
B VEHICLE BODY
Q INSPECTION REFERENCE POINT
R, R1, R2, R3, R4, R5, R6 RADAR DEVICE
O OPTICAL AXIS
6 CONTROL DEVICE
61 FIRST MARKER POSITION AND POSTURE CALCULATION UNIT
62 POSITION AND POSTURE CALCULATION UNIT
63 VEHICLE-BODY POSITION AND POSTURE CALCULATION UNIT
64 TARGET POSITION AND POSTURE CALCULATION UNIT
65 RADAR ATTACHMENT POSITION AND DIRECTION CALCULATION UNIT
66 NORMAL POSTURE CALCULATION UNIT
67 TARGET ROBOT CONTROL UNIT
T, T1, T2, T3, T4, T5, T6 TARGET ROBOT
71 ROBOT MAIN BODY
72 TRAVEL DEVICE
73 POSTURE CHANGING DEVICE
74 FRAME
75 CORNER REFLECTOR
76 ELECTROMAGNETIC WAVE CHARACTERISTIC MEASUREMENT DEVICE
76a ELECTROMAGNETIC WAVE INCIDENT SURFACE
77 FIRST TARGET BOARD
78 SECOND TARGET BOARD
791 FIRST ELECTROMAGNETIC WAVE ABSORBING BODY
792 SECOND ELECTROMAGNETIC WAVE ABSORBING BODY
793 THIRD ELECTROMAGNETIC WAVE ABSORBING BODY

What is claimed is:

1. A vehicle inspection device that adjusts a sensor axis of a first external environment sensor in a vehicle in which the first external environment sensor that acquires external environment information is attached to a vehicle body, the vehicle inspection device comprising:
   a moving body including a reflector that reflects an electromagnetic wave emitted from the first external environment sensor, and an electromagnetic wave characteristic measurement device that measures characteristics of the electromagnetic wave emitted from the first external environment sensor; and a control device that controls the moving body, wherein the control device calculates an attachment position of the first external environment sensor and a direction of the sensor axis on the basis of electromagnetic wave characteristics measured by the electromagnetic wave characteristic measurement device, and moves the moving body to an inspection position that is determined on the basis of the calculation result.

2. The vehicle inspection device according to claim 1, wherein a second external environment sensor that acquires external environment information different from the information acquired by the first external environment sensor is attached to the vehicle body, and the moving body further includes a target with respect to the second external environment sensor.

3. The vehicle inspection device according to claim 1, wherein an electromagnetic wave incident surface of the electromagnetic wave characteristic measurement device, and the reflector are respectively provided on different surfaces of a main body of the moving body, and the control device controls the moving body so that the reflector faces the first external environment sensor at the inspection position.

4. The vehicle inspection device according to claim 3, wherein the main body is provided with the reflector, the electromagnetic wave characteristic measurement device, and an electromagnetic wave absorbing body that absorbs the electromagnetic wave emitted from the first external environment sensor to suppress a reflected wave, the electromagnetic wave absorbing body is provided on a surface that faces the first external environment sensor in a case where the reflector in the main body is made to face the first external environment sensor, and the electromagnetic wave characteristic measurement device is provided in the main body to be hidden by the electromagnetic wave absorbing body when viewed from the first external environment sensor in a state in which the reflector is made to face the first external environment sensor.

5. The vehicle inspection device according to claim 2, wherein an electromagnetic wave incident surface of the electromagnetic wave characteristic measurement device, and the reflector are respectively provided on different surfaces of a main body of the moving body, and the control device controls the moving body so that the reflector faces the first external environment sensor at the inspection position.

6. The vehicle inspection device according to claim 5, wherein the main body is provided with the reflector, the electromagnetic wave characteristic measurement device, and an electromagnetic wave absorbing body that absorbs the electromagnetic wave emitted from the first external environment sensor to suppress a reflected wave, the electromagnetic wave absorbing body is provided on a surface that faces the first external environment sensor in a case where the reflector in the main body is made to face the first external environment sensor, and the electromagnetic wave characteristic measurement device is provided in the main body to be hidden by the electromagnetic wave absorbing body when viewed from the first external environment sensor in a state in which the reflector is made to face the first external environment sensor.

* * * * *